(12) United States Patent  (10) Patent No.: US 11,820,953 B2
Shibata et al.  (45) Date of Patent: Nov. 21, 2023

(54) FLUORINE-CONTAINING ETHER COMPOUND, LUBRICANT FOR MAGNETIC RECORDING MEDIUM AND MAGNETIC RECORDING MEDIUM

(71) Applicant: Resonac Corporation, Tokyo (JP)

(72) Inventors: Natsumi Shibata, Ichihara (JP); Tsuyoshi Kato, Ichihara (JP); Daisuke Yagyu, Ichihara (JP); Shunya Suzuki, Ichihara (JP); Masaki Nanko, Ichihara (JP); Naoya Fukumoto, Ichihara (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 17/437,251

(22) PCT Filed: Mar. 12, 2020

(86) PCT No.: PCT/JP2020/010759
§ 371 (c)(1),
(2) Date: Sep. 8, 2021

(87) PCT Pub. No.: WO2020/184653
PCT Pub. Date: Sep. 17, 2020

(65) Prior Publication Data
US 2022/0169941 A1 Jun. 2, 2022

(30) Foreign Application Priority Data
Mar. 12, 2019 (JP) .................. 2019-044942

(51) Int. Cl.
*C10M 107/38* (2006.01)
*G11B 5/725* (2006.01)
(Continued)

(52) U.S. Cl.
CPC ......... *C10M 107/38* (2013.01); *C08G 65/226* (2013.01); *G11B 5/7257* (2020.08);
(Continued)

(58) Field of Classification Search
CPC .... G11B 5/725; G11B 5/7257; C10M 107/38; C10M 2213/06; C10M 2213/0606;
(Continued)

(56) References Cited

U.S. PATENT DOCUMENTS 4,526,833 A  7/1985 Burguette et al.
6,323,163 B1  11/2001 Sasaki et al.
(Continued)

FOREIGN PATENT DOCUMENTS

CN  101121908 A  2/2008
EP  1 479 753 A2  11/2004
(Continued)

OTHER PUBLICATIONS

International Search Report of PCT/JP2020/010759 dated May 26, 2020 [PCT/ISA/210].
(Continued)

*Primary Examiner* — Holly Rickman
(74) *Attorney, Agent, or Firm* — Sughrue Mion, PLLC

(57) ABSTRACT

This fluorine-containing ether compound is a fluorine-containing ether compound represented by formula (1).

$$R^1—X—R^2—CH_2—R^3—CH_2—R^4 \quad (1)$$

(In formula (1), $R^1$ is an alkenyloxy group of 2 to 8 carbon atoms or an alkynyloxy group of 3 to 8 carbon atoms. $R^2$ is represented by formula (2) shown below. In formula (2), a represents an integer of 1 to 3. X is represented by formula (3) shown below. In formula (3), b represents an integer of 1 to 5, Y is a divalent linking group that is bonded to a carbon atom in formula (2), and R represents an alkyl group of 1 to 6 carbon atoms or H. $R^3$ represents a perfluoropolyether chain. $R^4$ represents a terminal group containing two or three polar groups, wherein each polar group is bonded to a different carbon atom, and the carbon atoms to which the (Continued)

polar groups are bonded are bonded to each other via a linking group containing a carbon atom to which a polar group is not bonded.)

[Chemical formula 1]

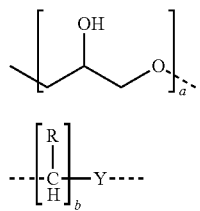

(2)

(3)

11 Claims, 1 Drawing Sheet

(51) Int. Cl.
*C08G 65/22* (2006.01)
*C10N 40/18* (2006.01)
*C10N 50/08* (2006.01)

(52) U.S. Cl.
CPC . *C10M 2213/0606* (2013.01); *C10N 2040/18* (2013.01); *C10N 2050/08* (2013.01)

(58) Field of Classification Search
CPC .............. C08G 65/226; C08G 2650/48; C10N 2040/18; C10N 2050/08
See application file for complete search history.

(56) References Cited

U.S. PATENT DOCUMENTS

| | | | |
|---|---|---|---|
| 10,803,898 B2 | 10/2020 | Fukumoto et al. | |
| 11,011,200 B2 | 5/2021 | Uetake et al. | |
| 11,220,649 B2 * | 1/2022 | Fukumoto | C07C 43/1786 |
| 11,225,624 B2 | 1/2022 | Kato et al. | |
| 11,261,394 B2 | 3/2022 | Kato et al. | |
| 11,279,664 B2 * | 3/2022 | Yagyu | C07C 43/23 |
| 11,427,779 B2 | 8/2022 | Yamaguchi et al. | |
| 11,639,330 B2 | 5/2023 | Nanko et al. | |
| 2004/0235685 A1 | 11/2004 | Russo et al. | |
| 2005/0123855 A1 | 6/2005 | Hegel | |
| 2006/0111251 A1 | 5/2006 | Tonelli et al. | |
| 2009/0281250 A1 | 11/2009 | Desimone et al. | |
| 2010/0233513 A1 | 9/2010 | Imai et al. | |
| 2010/0261039 A1 | 10/2010 | Itoh et al. | |
| 2012/0008228 A1 | 1/2012 | Mabuchi et al. | |
| 2012/0225217 A1 | 9/2012 | Itoh et al. | |
| 2013/0209837 A1 | 8/2013 | Sagata et al. | |
| 2015/0274960 A1 | 10/2015 | Fukuda et al. | |
| 2015/0371672 A1 | 12/2015 | Sagata | |
| 2016/0068778 A1 | 3/2016 | Conley et al. | |
| 2017/0152456 A1 | 6/2017 | Sagata et al. | |
| 2017/0260472 A1 | 9/2017 | Sagata et al. | |
| 2018/0009773 A1 | 1/2018 | Uetake et al. | |
| 2018/0022851 A1 | 1/2018 | Takao et al. | |
| 2018/0047419 A1 | 2/2018 | Fukumoto et al. | |
| 2018/0127543 A1 | 5/2018 | Watanabe et al. | |
| 2019/0084911 A1 | 3/2019 | Yagyu et al. | |
| 2019/0185621 A1 | 6/2019 | Naitou et al. | |
| 2019/0352573 A1 | 11/2019 | Hatta et al. | |
| 2019/0382675 A1 | 12/2019 | Fukumoto et al. | |
| 2019/0382676 A1 | 12/2019 | Yamaguchi et al. | |
| 2020/0010619 A1 | 1/2020 | Minami et al. | |
| 2021/0062101 A1 | 3/2021 | Kato et al. | |
| 2021/0062102 A1 | 3/2021 | Kato et al. | |
| 2021/0188766 A1 | 6/2021 | Nanko et al. | |
| 2022/0372390 A1 | 11/2022 | Asano et al. | |
| 2023/0090239 A1 | 3/2023 | Nanko | |

FOREIGN PATENT DOCUMENTS

| | | |
|---|---|---|
| EP | 3 081 549 A1 | 10/2016 |
| JP | 61-126052 A | 6/1986 |
| JP | 11-60720 A | 3/1999 |
| JP | 11-71440 A | 3/1999 |
| JP | 2866622 B2 | 3/1999 |
| JP | 2000-264883 A | 9/2000 |
| JP | 2001-134924 A | 5/2001 |
| JP | 2001-209924 A | 8/2001 |
| JP | 2002-69037 A | 3/2002 |
| JP | 2004-115640 | 4/2004 |
| JP | 2004-346318 A | 12/2004 |
| JP | 2006-131874 A | 5/2006 |
| JP | 2009-266360 A | 11/2009 |
| JP | 2010-143855 A | 7/2010 |
| JP | 2010-241831 A | 10/2010 |
| JP | 4632144 B2 | 2/2011 |
| JP | 2012-009090 A | 1/2012 |
| JP | 2012-33253 A | 2/2012 |
| JP | 2013-163667 A | 8/2013 |
| JP | 2013-181014 A | 9/2013 |
| JP | 2013-181140 A | 9/2013 |
| JP | 2014-509677 A | 4/2014 |
| JP | 5465454 B2 | 4/2014 |
| JP | 5613916 B2 | 10/2014 |
| JP | 5909837 B2 | 4/2016 |
| JP | 6122191 B1 | 4/2017 |
| JP | 2018-002673 A | 1/2018 |
| JP | 2018-24614 A | 2/2018 |
| JP | 2018-035348 A | 3/2018 |
| WO | 98/17617 A1 | 4/1998 |
| WO | 2006/011387 A1 | 2/2006 |
| WO | 2009/035075 A1 | 3/2009 |
| WO | 2009/123043 A1 | 10/2009 |
| WO | 2011/099131 A1 | 8/2011 |
| WO | 2012/170009 A2 | 12/2012 |
| WO | 2015/087615 A1 | 6/2015 |
| WO | 2015/199037 A1 | 12/2015 |
| WO | 2016/084781 A1 | 6/2016 |
| WO | 2017/145995 A1 | 8/2017 |
| WO | 2017/154403 A1 | 9/2017 |
| WO | 2018/116742 A1 | 6/2018 |
| WO | 2018/139058 A1 | 8/2018 |
| WO | 2018/139174 A1 | 8/2018 |
| WO | 2018/147017 A1 | 8/2018 |
| WO | 2018/159232 A1 | 9/2018 |
| WO | 2019/039200 A1 | 2/2019 |
| WO | 2019/049585 A1 | 3/2019 |
| WO | 2019/054148 A1 | 3/2019 |
| WO | 2019/087548 A1 | 5/2019 |

OTHER PUBLICATIONS

International Search Report for PCT/JP2020/041613, dated Dec. 28, 2020.
Communication dated Dec. 24, 2019, from the Japanese Patent Office in Application No. 2016-133653.
International Search Report for PCT/JP2020/033971 dated Nov. 24, 2020 [PCT/ISA/210].
International Search Report for PCT/JP2021/003708 dated Mar. 23, 2021.
Notice of Allowance dated Feb. 8, 2021 from the US Patent & Trademark Office in U.S. Appl. No. 15/640,729.
Restriction Requirement dated Jun. 10, 2019 from the US & Patent & Trademark Office in U.S. Appl. No. 15/640,729.
Non-Final Office Action dated Jun. 8, 2021 from the US & Patent & Trademark Office in U.S. Appl. No. 16/082,349.
Supplemental Notice of Allowance dated Mar. 4, 2021 from the US & Patent & Trademark Office in U.S. Appl. No. 15/640,729.
Non-Final Office Action dated May 13, 2020 from the US & Patent & Trademark Office in U.S. Appl. No. 15/640,729.

(56) References Cited

OTHER PUBLICATIONS

Office Action dated Nov. 12, 2020 from the US & Patent & Trademark Office in U.S. Appl. No. 15/640,729.
Non-Final Office Action dated Oct. 29, 2019 from the US & Patent & Trademark Office in U.S. Appl. No. 15/640,729.
International Search Report for PCT/JP2019/033697 dated Nov. 5, 2019.
International Search Report for PCT/JP2018/000071 dated Mar. 6, 2018 [PCT/ISA/210].
International Search Report for PCT/JP2018/031161, dated Nov. 27, 2018 (PCT/ISA/210).
International Search Report for PCT/JP2019/033700 dated Nov. 12, 2019 [PCT/ISA/210].
Notice of Allowance dated Feb. 9, 2023 in U.S. Appl. No. 17/274,702.
Notice of Allowance dated May 5, 2022 in U.S. Appl. No. 16/480,483.
Notice of Allowance dated Nov. 9, 2021 in U.S. Appl. No. 16/644,586.
Supplemental Notice of Allowance dated Dec. 2, 2021 in U.S. Appl. No. 16/644,586.
Office Action dated Jan. 19, 2022 in U.S. Appl. No. 16/480,483.
Office Action dated Jul. 23, 2021 in U.S. Appl. No. 16/644,586.
Office Action dated Jun. 21, 2021 in U.S. Appl. No. 16/480,483.
Office Action dated Oct. 25, 2022 in U.S. Appl. No. 17/274,702.
Office Action dated May 24, 2023 in U.S. Appl. No. 17/772,043.
Non-Final Office Action dated Jun. 7, 2023 in U.S. Appl. No. 17/797,177.
Office Action dated Mar. 11, 2021 from the China National Intellectual Property Administration in CN Application No. 201780070908.1.
International Search Report for PCT/JP2017/043451 dated Feb. 27, 2018.
"Cihai Sciences vol. I", Edited by Cihai Editorial Committee, Shanghai Lexicographical Publishing House, Aug. 30, 1980, p. 329 (3 pages total).
Office Action dated May 25, 2021 from the China National Intellectual Property Administration in CN Application No. 201780012469.9.
Office Action dated Dec. 2, 2020 from the China National Intellectual Property Administration in CN Application No. 201780012469.9.
International Search Report for PCT/JP2017/003165 dated May 9, 2017.
Office Action Non-Final dated Jun. 8, 2021, issued in U.S. Appl. No. 16/082,349.
Notice of Allowance dated Nov. 16, 2021, issued in U.S. Appl. No. 16/082,349.
Restriction Election Requirement dated Nov. 23, 2020, issued in U.S. Appl. No. 16/480,464.
Office Action Non-Final dated Jan. 28, 2021, issued in U.S. Appl. No. 16/480,464.
Office Action Final dated Apr. 16, 2021, issued in U.S. Appl. No. 16/480,464.
Advisory Action dated Aug. 11, 2021, issued in U.S. Appl. No. 16/480,464.
Notice of Allowance dated Sep. 10, 2021, issued in U.S. Appl. No. 16/480,464.

* cited by examiner

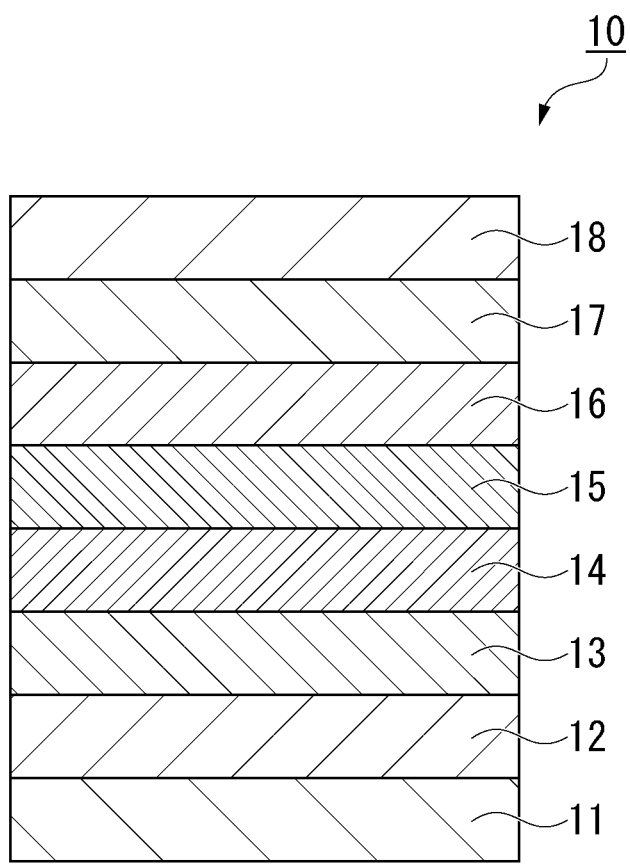

FLUORINE-CONTAINING ETHER COMPOUND, LUBRICANT FOR MAGNETIC RECORDING MEDIUM AND MAGNETIC RECORDING MEDIUM

CROSS REFERENCE TO RELATED APPLICATIONS

This application is a National Stage of International Application No. PCT/JP2020/010759, filed Mar. 12, 2020, claiming priority to Japanese Patent Application No. 2019-044942, filed Mar. 12, 2019, the contents of all of which are incorporated herein by reference in their entirety.

TECHNICAL FIELD

The present invention relates to a fluorine-containing ether compound, a lubricant for a magnetic recording medium, and a magnetic recording medium.

BACKGROUND ART

In order to improve the recording density of magnetic recording and playback devices, the development of magnetic recording media that are suited for high recording densities continues to progress.

Conventional magnetic recording media include media obtained by forming a recording layer on a substrate, and then forming a protective layer of carbon or the like on the recording layer. The protective layer protects the information recorded on the recording layer, and also enhances the slidability of the magnetic head. However, satisfactory durability for the recording medium cannot be achieved simply by providing a protective layer on the recording layer. Therefore, a lubricant layer is generally formed by applying a lubricant to the surface of the protective layer.

Examples of lubricants that have been proposed for the lubricant which is used when forming the lubricant layer for the magnetic recording medium include lubricants containing a fluorine-based polymer having a repeating structure containing $CF_2$ and having polar groups such as hydroxyl groups at the polymer terminals (for example, see Patent Document 1 and Patent Document 2).

For example, Patent Document 1 discloses a fluorine-containing ether compound having polar groups and a terminal group containing an organic group having at least one of a double bond or a triple bond. Further, Patent Document 2 discloses a fluorine-containing ether compound having polar groups and having an alkenyl group or alkynyl group at each of the two terminals.

CITATION LIST

Patent Documents

Patent Document 1: International Patent Publication No. 2017/154403
Patent Document 2: International Patent Publication No. 2018/139058

SUMMARY OF INVENTION

Problems to be Solved by the Invention

In magnetic recording and playback devices, further reductions in the floating height of the magnetic head would be desirable. Accordingly, reducing the thickness of the lubricant layer in the magnetic recording medium is desirable.

However, generally, if the thickness of the lubricant layer is reduced, then the coating properties of the lubricant layer may sometimes deteriorate, and the wear resistance of the magnetic recording medium tends to worsen.

The present invention has been developed in light of the above circumstances, and has an object of providing a fluorine-containing ether compound that is suitable as a material for a magnetic recording medium lubricant that is capable of forming a lubricant layer which can provide excellent wear resistance even when the thickness of the layer is reduced.

Further, the present invention also has an object of providing a magnetic recording medium lubricant containing the fluorine-containing ether compound of the present invention.

Furthermore, the present invention also has an object of providing a magnetic recording medium of superior reliability and durability having a lubricant layer containing the fluorine-containing ether compound of the present invention.

Means for Solving the Problems

The inventors of the present invention conducted intensive research aimed at achieving the above objects.

As a result, they discovered that the above objects could be achieved by using a fluorine-containing ether compound having a structure in which one terminal group is an alkenyloxy group or alkynyloxy group, and a linking group having a specific structure and a linking group having a polar group are disposed in sequence from the terminal group side between the terminal group and a perfluoropolyether chain, thereby separating the linking group having a polar group and the terminal group by an appropriate distance, and they were therefore able to complete the present invention.

In other words, the present invention relates to the following items.

[1] A fluorine-containing ether compound represented by a formula (1) shown below.

$$R^1—X—R^2—CH_2—R^3—CH_2—R^4 \quad (1)$$

(In formula (1), $R^1$ is an alkenyloxy group of 2 to 8 carbon atoms or an alkynyloxy group of 3 to 8 carbon atoms. $R^2$ is represented by a formula (2) shown below. In formula (2), a represents an integer of 1 to 3. X is represented by a formula (3) shown below. In formula (3), b represents an integer of 1 to 5, Y is a divalent linking group that is bonded to a carbon atom in formula (2), and R represents an alkyl group of 1 to 6 carbon atoms or H. $R^3$ represents a perfluoropolyether chain. $R^4$ represents a terminal group containing two or three polar groups, wherein each polar group is bonded to a different carbon atom, and the carbon atoms to which the polar groups are bonded are bonded to each other via a linking group containing a carbon atom to which a polar group is not bonded.)

[Chemical formula 1]

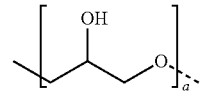

(2)

-continued

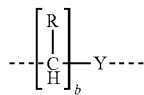
(3)

[2] The fluorine-containing ether compound according to [1], wherein Y in the formula (3) represents one of O, S and $CH_2$.

[3] The fluorine-containing ether compound according to [1] or [2], wherein R in the formula (3) represents a methyl group or H.

[4] The fluorine-containing ether compound according to any one of [1] to [3], wherein $R^1$ in the formula (1) represents one of a vinyloxy group, an allyloxy group, a 3-butenyloxy group, a 4-pentenyloxy group and a propargyloxy group.

[5] The fluorine-containing ether compound according to any one of [1] to [4], wherein $R^3$ in the formula (1) is represented by any one of formulas (4) to (6) shown below.

$$-CF_2O-(CF_2CF_2O)_c-(CF_2O)_d-CF_2-$$ (4)

(In formula (4), c and d indicate the average polymerization degree, and each represents a number from 0 to 30, provided that c and d are not both 0.)

$$-CF(CF_3)-(OCF(CF_3)CF_2)_e-OCF(CF_3)-$$ (5)

(In formula (5), e indicates the average polymerization degree, and represents a number from 0.1 to 30.)

$$-CF_2CF_2O-(CF_2CF_2CF_2O)_f-CF_2CF_2-$$ (6)

(In formula (6), f indicates the average polymerization degree, and represents a number from 0.1 to 30.)

[6] The fluorine-containing ether compound according to any one of [1] to [5], wherein the polar groups in $R^4$ in the formula (1) are hydroxyl groups.

[7] The fluorine-containing ether compound according to any one of [1] to [6], wherein $R^4$ in the formula (1) is a terminal group represented by any one of formulas (7) to (10) shown below.

[Chemical formula 2]

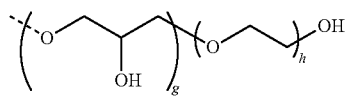
(7)

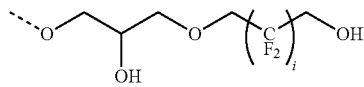
(8)

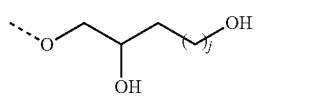
(9)

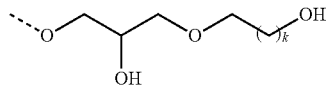
(10)

(In formula (7), g represents an integer of 1 or 2, and h represents an integer of 1 to 5.)
(In formula (8), i represents an integer of 2 to 5.)
(In formula (9), j represents an integer of 1 to 5.)
(In formula (10), k represents an integer of 2 to 5.)

[8] The fluorine-containing ether compound according to any one of [1] to [7], having a number average molecular weight within a range from 500 to 10,000.

[9] A lubricant for a magnetic recording medium, the lubricant containing the fluorine-containing ether compound according to any one of [1] to [8].

[10] A magnetic recording medium containing at least a magnetic layer, a protective layer and a lubricant layer provided sequentially on a substrate, wherein the lubricant layer contains the fluorine-containing ether compound according to any one of [1] to [8].

[11] The magnetic recording medium according to [10], wherein the average thickness of the lubricant layer is within a range from 0.5 nm to 2 nm.

Effects of the Invention

The fluorine-containing ether compound of the present invention is ideal as a material for a lubricant for a magnetic recording medium.

Because the lubricant for a magnetic recording medium according to the present invention contains the fluorine-containing ether compound of the present invention, a lubricant layer can be formed that has excellent wear resistance even when the thickness of the layer is thin.

The magnetic recording medium of the present invention is provided with a lubricant layer having excellent wear resistance, and therefore exhibits excellent reliability and durability.

BRIEF DESCRIPTION OF THE DRAWINGS

FIG. 1 is a schematic cross-sectional view illustrating one embodiment of a magnetic recording medium of the present invention.

DESCRIPTION OF EMBODIMENTS

The fluorine-containing ether compound, the lubricant for a magnetic recording medium (hereafter sometimes abbreviated as simply "the lubricant"), and the magnetic recording medium according to the present invention are described below in detail. However, the present invention is not limited solely to the embodiments described below.

[Fluorine-Containing Ether Compound]

The fluorine-containing ether compound of an embodiment of the present invention is represented by formula (1) shown below.

$$R^1-X-R^2-CH_2-R^3-CH_2-R^4$$ (1)

(In formula (1), $R^1$ is an alkenyloxy group of 2 to 8 carbon atoms or an alkynyloxy group of 3 to 8 carbon atoms. $R^2$ is represented by formula (2) shown below. In formula (2), a represents an integer of 1 to 3. X is represented by formula (3) shown below. In formula (3), b represents an integer of 1 to 5, Y is a divalent linking group that is bonded to a carbon atom in formula (2), and R represents an alkyl group of 1 to 6 carbon atoms or H. $R^3$ represents a perfluoropolyether chain. $R^4$ represents a terminal group containing two or three polar groups, wherein each polar group is bonded to a different carbon atom, and the carbon atoms to which the polar groups are bonded are bonded to each other via a linking group containing a carbon atom to which a polar group is not bonded.)

[Chemical formula 3]

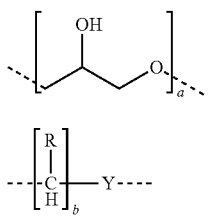

(2)

(3)

In the fluorine-containing ether compound represented by the above formula (1), $R^1$ represents an alkenyloxy group of 2 to 8 carbon atoms or an alkynyloxy group of 3 to 8 carbon atoms. In the fluorine-containing ether compound of this embodiment, the alkenyloxy group or alkynyloxy group of $R^1$ and the hydroxyl group (—OH) in $R^2$ exhibit favorable interactions with the protective layer in a lubricant layer containing the fluorine-containing ether compound. In the fluorine-containing ether compound of this embodiment, the alkenyloxy group of 2 to 8 carbon atoms or the alkynyloxy group of 3 to 8 carbon atoms that is represented by $R^1$ may be selected appropriately in accordance with the performance and the like required of the lubricant containing the fluorine-containing ether compound.

The alkenyloxy group of 2 to 8 carbon atoms for $R^1$ is a group having one carbon-carbon double bond. When $R^1$ is an alkenyloxy group, provided the number of carbon atoms in the alkenyloxy group is not more than 8, the distance between the double bond within $R^1$ and the hydroxyl group within $R^2$ is kept at an appropriate distance by the existence of X represented by formula (3), regardless of the structure of the alkenyloxy group. As a result, the fluorine-containing ether compound represented by formula (1) and contained within the lubricant layer exhibits a favorable interaction with the protective layer.

There are no particular limitations on the alkenyloxy group of 2 to 8 carbon atoms for $R^1$, and examples include a vinyloxy group, allyloxy group, crotyloxy group, butenyloxy group, beta-methallyloxy group, methylbutenyloxy group, pentenyloxy group, hexenyloxy group, heptenyloxy group and octenyloxy group. Among these, in order to obtain a lubricant layer that exhibits favorable affinity with the protective layer of a magnetic recording medium, an alkenyloxy group of 2 to 5 carbon atoms is preferred. Specifically, a vinyloxy group, allyloxy group, 3-butenyloxy group or 4-pentenyloxy group is preferred, and an allyloxy group is particularly desirable. In those cases where $R^1$ is an alkenyloxy group of 3 or more carbon atoms, in order to obtain a fluorine-containing ether compound that yields a lubricant layer having a more favorable interaction with the protective layer of a magnetic recording medium, the double bond is preferably positioned at the terminal-most end of the fluorine-containing ether compound.

The alkynyloxy group of 3 to 8 carbon atoms for $R^1$ is a group having one carbon-carbon triple bond. When $R^1$ is an alkynyloxy group, provided the number of carbon atoms in the alkynyloxy group is not more than 8, the distance between the triple bond within $R^1$ and the hydroxyl group within $R^2$ is kept at an appropriate distance by the existence of X represented by formula (3), regardless of the structure of the alkynyloxy group. As a result, the fluorine-containing ether compound represented by formula (1) and contained within the lubricant layer exhibits a favorable interaction with the protective layer.

There are no particular limitations on the alkynyloxy group of 3 to 8 carbon atoms for $R^1$, and examples include a 1-propynyloxy group, propargyloxy group, butynyloxy group, methylbutynyloxy group, pentynyloxy group, methylpentynyloxy group, hexynyloxy group, methylhexynyloxy group, heptynyloxy group, and octynyloxy group. Among these, in order to obtain a lubricant layer that exhibits favorable affinity with the protective layer of a magnetic recording medium, an alkynyloxy group of 3 to 5 carbon atoms is preferred. Specifically, a 1-propynyloxy group, propargyloxy group, butynyloxy group or pentynyloxy group is preferred, and a propargyloxy group is particularly desirable. Further, the alkynyloxy group may also include an alkenyloxy group within the molecule, such as a vinylpentynyloxy group. In those cases where $R^1$ is an alkynyloxy group of 3 or more carbon atoms, in order to obtain a fluorine-containing ether compound that yields a lubricant layer having a more favorable interaction with the protective layer of a magnetic recording medium, the triple bond is preferably positioned at the terminal-most end of the fluorine-containing ether compound.

$R^2$ in the above formula (1) is represented by formula (2) shown below.

[Chemical formula 4]

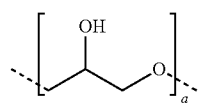

(2)

(In formula (2), a represents an integer of 1 to 3.)

As indicated by formula (2), $R^2$ is a divalent linking group having a hydroxyl group. Further, a in the above formula (2) is an integer of 1 to 3, and therefore $R^2$ has from 1 to 3 hydroxyl groups. Because $R^2$ has one or more hydroxyl groups which are polar groups, when a lubricant layer is formed on the protective layer using a lubricant containing the fluorine-containing ether compound of the present embodiment, a favorable interaction occurs between the lubricant layer and the protective layer. Accordingly, in the lubricant layer containing the fluorine-containing ether compound of the present embodiment, in addition to the interaction between the protective layer and the alkenyloxy group of 2 to 8 carbon atoms or alkynyloxy group of 3 to 8 carbon atoms of $R^1$, an interaction between the protective layer and the hydroxyl group(s) of $R^2$ is also obtained. As a result, the affinity between the lubricant layer and the protective layer is very favorable, and a lubricant layer having excellent wear resistance is obtained.

In the above formula (2), a is an integer of 1, 2 or 3, and is preferably 2.

Because a in formula (2) is at least 1, when a lubricant layer is formed on the protective layer using a lubricant containing the fluorine-containing ether compound of the present embodiment, an interaction occurs between the hydroxyl group(s) of $R^2$ and the protective layer. When a is 2 or greater, the interaction between the hydroxyl groups of $R^2$ and the protective layer is more marked.

Further, because a in formula (2) is not more than 3, the polarity of the fluorine-containing ether compound does not become too high due to excessive numbers of hydroxyl groups in $R^2$. Accordingly, pickup, which is adherence of the fluorine-containing ether compound to the magnetic head as foreign matter (smear), can be suppressed.

X in the above formula (1) is represented by formula (3) shown below.

[Chemical formula 5]

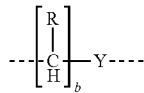   (3)

(In formula (3), b represents an integer of 1 to 5, Y is a divalent linking group that is bonded to a carbon atom in formula (2), and R represents an alkyl group of 1 to 6 carbon atoms or H.)

In formula (3), b represents an integer of 1 to 5, but in terms of achieving a more appropriate distance between $R^1$ and $R^2$, b is preferably an integer of 1 to 3, and is particularly preferably an integer of 2 or 3.

Y in formula (3) represents a divalent linking group that is bonded to a carbon atom in formula (2), and may be selected appropriately in accordance with the performance and the like required of the lubricant containing the fluorine-containing ether compound. Examples of Y in formula (3) include O (oxygen), S, and $CH_2$. Among these, in order to obtain a fluorine-containing ether compound that exhibits favorable affinity with the protective layer of a magnetic recording medium, Y in formula (3) is preferably O or $CH_2$, and O is particularly desirable.

R in formula (3) represents an alkyl group of 1 to 6 carbon atoms or H. Examples of the alkyl group of 1 to 6 carbon atoms include a methyl group, ethyl group, normal propyl group, isopropyl group, normal butyl group, isobutyl group, sec-butyl group, tert-butyl group, normal pentyl group, isopentyl group, neopentyl group, normal hexyl group, and isohexyl group. Among these, R in formula (3) is preferably a methyl group or H, and H is particularly desirable.

Specific examples of X in the above formula (1) when Y in formula (3) is O (oxygen) include structures such as $-(CH_2)_b-O-$, $-\{C(CH_3)H\}_b-O-$, $-\{C(C_2H_5)H\}_b-O-$, $-\{C(C_3H_7)H\}_b-O-$, $-\{C(C_4H_9)H\}_b-O-$, $-\{C(C_5H_{11})H\}_b-O-$, and $-\{C(C_6H_{13})H\}_b-O-$.

Further, when Y in formula (3) is S, examples of X include structures such as $-(CH_2)_b-S-$, $-\{C(CH_3)H\}_b-S-$, $-\{C(C_2H_5)H\}_b-S-$, $-\{C(C_3H_7)H\}_b-S-$, $-\{C(C_4H_9)H\}_b-S-$, $-\{C(C_5H_{11})H\}_b-S-$, and $-\{C(C_6H_{13})H\}_b-S-$.

Furthermore, when Y in formula (3) is $CH_2$, examples of X include structures such as $-(CH_2)_b-CH_2-$, $-\{C(CH_3)H\}_b-CH_2-$, $-\{C(C_2H_5)H\}_b-CH_2-$, $-\{C(C_3H_7)H\}_b-CH_2-$, $-\{C(C_4H_9)H\}_b-CH_2-$, $-\{C(C_5H_{11})H\}_b-CH_2-$, and $-\{C(C_6H_{13})H\}_b-CH_2-$.

In the above structures representing specific examples of X, b represents an integer of 1 to 5.

Among the above structures, X in formula (1) is preferably $-CH_2-O-$, $-(CH_2)_2-O-$, $-(CH_2)_3-O-$, $-(CH_2)_2-CH_2-$, $-(CH_2)_3-CH_2-$ or $-C(CH_3)H-O-$, and $-(CH_2)_2-O-$ or $-(CH_2)_3-O-$ is particularly desirable.

In the fluorine-containing ether compound of the present embodiment, as illustrated in formula (1), X is bonded between $R^1$ and $R^2$. As a result, compared with compounds in which $R^1$ and $R^2$ are bonded directly to each other, the fluorine-containing ether compound of the present embodiment exhibits a greater distance separation between the double bond or triple bond in $R^1$ and the hydroxyl group(s) in $R^2$. It is though that this ensures that the intramolecular interaction between the alkenyloxy group of 2 to 8 carbon atoms or alkynyloxy group of 3 to 8 carbon atoms of $R^1$ and the hydroxyl group(s) of $R^2$ is of an appropriate level, resulting in superior wear resistance.

$R^3$ in the above formula (1) is a perfluoropolyether chain (hereafter, sometimes abbreviated as "PFPE chain"). In a lubricant layer containing the fluorine-containing ether compound of the present embodiment, the PFPE chain coats the surface of the protective layer, and also reduces the frictional force between the magnetic head and the protective layer. The PFPE chain may be selected appropriately in accordance with the performance and the like required of the lubricant containing the fluorine-containing ether compound.

Examples of the PFPE chain include chains composed of a perfluoromethylene oxide polymer, perfluoroethylene oxide polymer, perfluoro-n-propylene oxide polymer, or perfluoroisopropylene oxide polymer, chains based on these types of polymers, and chains composed of copolymers of the monomers that constitute these polymers.

Specifically, $R^3$ in formula (1) is preferably a structure represented by one of formulas (4) to (6) shown below. In formula (4), there are no particular limitations on the sequence order of the $(CF_2CF_2O)$ and $(CF_2O)$ repeating units. Formula (4) may include a random copolymer, block copolymer or alternating copolymer composed of the $(CF_2-CF_2-O)$ and $(CF_2-O)$ monomer units.

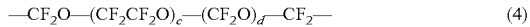   (4)

(In formula (4), c and d indicate the average polymerization degree, and each represents a number from 0 to 30, provided that c and d are not both 0.)

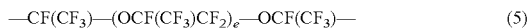   (5)

(In formula (5), e indicates the average polymerization degree, and represents a number from 0.1 to 30.)

   (6)

(In formula (6), f indicates the average polymerization degree, and represents a number from 0.1 to 30.)

When $R^3$ is a PFPE chain represented by one of the above formulas (4) to (6), a fluorine-containing ether compound is obtained that yields a lubricant layer having favorable wear resistance. Provided that c, d, e and f are not more than 30, the viscosity of the fluorine-containing ether compound does not become too high, meaning the lubricant containing the compound does not become difficult to apply. Further, c, d, e and f are more preferably not more than 20, and even more preferably 10 or less. Moreover, c, d, e and f are preferably at least 1, and more preferably 3 or greater.

When $R^3$ in formula (1) is represented by one of the above formulas (4) to (6), synthesis of the fluorine-containing ether compound is easier, which is desirable. When $R^3$ is represented by formula (4), the raw materials are more readily available, which is particularly desirable.

Further, when $R^3$ is represented by one of the above formulas (4) to (6), the ratio of the number of oxygen atoms (the number of ether bonds (—O—)) relative to the number of carbon atoms in the perfluoropolyether chain is appropriate. Consequently, a fluorine-containing ether compound having an appropriate level of hardness is obtained. As a result, the fluorine-containing ether compound applied to the protective layer is unlikely to undergo aggregation on the protective layer, and a thinner lubricant layer can be formed with a satisfactory coverage rate.

$R^4$ in the above formula (1) is a terminal group containing two or three polar groups, wherein each polar group is bonded to a different carbon atom, and the carbon atoms to which the polar groups are bonded are bonded to each other via a linking group containing a carbon atom to which a polar group is not bonded. A fluorine-containing ether compound having a terminal group represented by $R^4$ is less likely to undergo aggregation than, for example, a fluoroether compound in which two polar groups contained in the terminal group are bonded to different carbon atoms, and the carbon atoms to which the polar groups are bonded are bonded directly to each other. Accordingly, in a lubricant layer containing the fluorine-containing ether compound of the present embodiment, a problem that can arise when the fluorine-containing ether compound that exists without adhering (adsorbing) to the protective layer aggregates and adheres to the magnetic head as foreign matter (smear) can be prevented, and pickup is suppressed. Further, because molecules of the fluorine-containing ether compound are unlikely to aggregate, the fluorine-containing ether compound within the lubricant layer tends to spread across the protective layer in the in-plane direction, and is more likely to adopt a spread state. Consequently, in the lubricant containing the above fluorine-containing ether compound, it is surmised that the surface of the protective layer can be covered with a high coverage rate, enabling the formation of a lubricant layer having excellent resistance to chemical substances, even if the layer thickness is reduced.

The terminal group represented by $R^4$ contributes to the adhesion between the protective layer to which the lubricant containing the fluorine-containing ether compound of the present embodiment is applied, and the lubricant layer formed by applying the lubricant. $R^4$ in formula (1) may be selected appropriately in accordance with the performance and the like required of the lubricant containing the fluorine-containing ether compound.

Examples of the polar groups in $R^4$ include hydroxyl groups, amino groups, carboxyl groups and mercapto groups. The ether bond (—O—) is not included as one of the polar groups in $R^4$.

The polar groups in the terminal group represented by $R^4$ containing two or three polar groups are preferably hydroxyl groups, as this yields a lubricant layer containing a fluorine-containing ether compound having favorable adhesion to the protective layer.

$R^4$ in formula (1) is preferably a terminal group represented by any one of formulas (7) to (10) shown below. This type of $R^4$ group contributes to improved adhesion between the protective layer to which the lubricant containing the fluorine-containing ether compound of the present embodiment is applied, and the lubricant layer that is formed by applying the lubricant, and also contributes to a favorable coverage rate.

[Chemical formula 6]

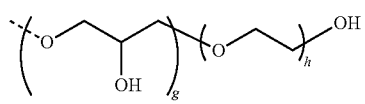
(7)

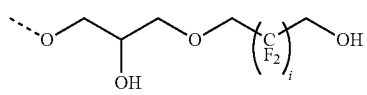
(8)

-continued

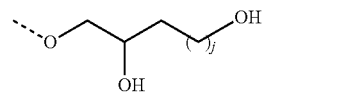
(9)

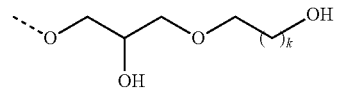
(10)

(In formula (7), g represents an integer of 1 or 2, and h represents an integer of 1 to 5.)

(In formula (8), i represents an integer of 2 to 5.)

(In formula (9), j represents an integer of 1 to 5.)

(In formula (10), k represents an integer of 2 to 5.)

In formula (7), g is an integer of 1 or 2.

In formula (7), when h is an integer of 1 to 5, the distance between the hydroxyl groups in the terminal group represented by formula (7) is appropriate, and a lubricant layer can be formed that exhibits excellent adhesion to the protective layer and a high coverage rate. Further, h is preferably 1 or 2, and is most preferably 1.

In formula (8), when i is an integer of 2 to 5, the distance between the hydroxyl group at the $R^3$-side of the formula and the terminal hydroxyl group is appropriate, and a lubricant layer can be formed that exhibits excellent adhesion to the protective layer and a high coverage rate. Further, i is preferably 2 or 3, and is most preferably 2.

In formula (9), when j is an integer of 1 to 5, the distance between the hydroxyl group at the $R^3$-side of the formula and the terminal hydroxyl group is appropriate, and a lubricant layer can be formed that exhibits excellent adhesion to the protective layer and a high coverage rate. Further, j is preferably 1 or 2, and is most preferably 1.

In formula (10), when k is an integer of 2 to 5, the distance between the hydroxyl group at the $R^3$-side of the formula and the terminal hydroxyl group is appropriate, and a lubricant layer can be formed that exhibits excellent adhesion to the protective layer and a high coverage rate. Further, k is preferably 2 or 3.

The fluorine-containing ether compound of the present embodiment is, specifically, preferably a compound represented by one of formulas (A) to (K) or (M) to (P) shown below. The labels ma to mk and na to nk in formulas (A) to (K) and the labels mm to mp, nm and nn in formulas (M) to (P) are numbers that indicate average polymerization degrees, and are therefore not necessarily integers.

Further, ma to mk in formulas (A) to (K) represent c in formula (4), and na to nk represent d in formula (4).

The compounds represented by formulas (A) to (K) below are all compounds in which $R^2$ in the above formula (1) is a linking group represented by the above formula (2) (wherein a is 2), $R^3$ is a PFPE chain represented by the above formula (4), and $R^4$ is a group represented by the above formula (7) (wherein g is 1 and h is 1).

The compound represented by formula (A) shown below is a compound in which $R^1$ in the above formula (1) is an allyloxy group, namely an alkenyloxy group of three carbon atoms, and X is a linking group represented by the above formula (3) (wherein b is 2, Y is O (oxygen), and R is H).

[Chemical formula 7]

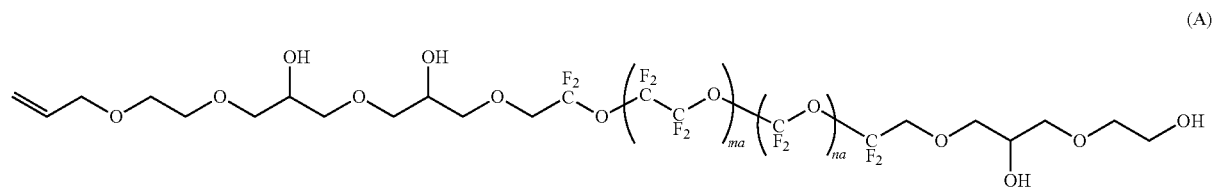
(A)

(In formula (A), ma and na indicate the average polymerization degree, wherein ma represents a number from 1 to 30, and na represents a number from 0 to 30.)

The compound represented by formula (B) shown below is a compound in which $R^1$ in the above formula (1) is an allyloxy group, namely an alkenyloxy group of three carbon atoms, and X is a linking group represented by the above formula (3) (wherein b is 1, Y is O (oxygen), and R is H).

[Chemical formula 8]

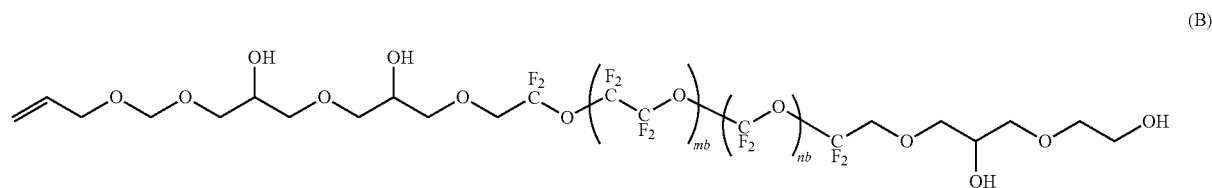
(B)

(In formula (B), mb and nb indicate the average polymerization degree, wherein nib represents a number from 1 to 30, and nb represents a number from 0 to 30.)

The compound represented by formula (C) shown below is a compound in which $R^1$ in the above formula (1) is an allyloxy group, namely an alkenyloxy group of three carbon atoms, and X is a linking group represented by the above formula (3) (wherein b is 3, Y is O (oxygen), and R is H).

[Chemical formula 9]

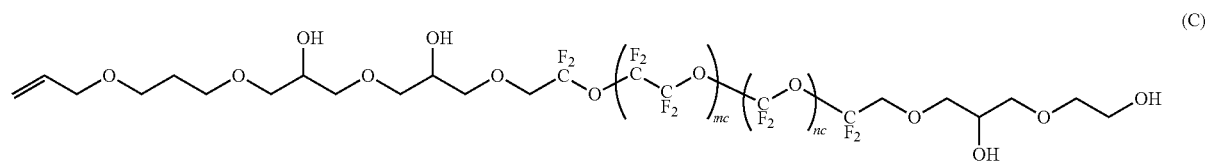
(C)

(In formula (C), mc and nc indicate the average polymerization degree, wherein mc represents a number from 1 to 30, and nc represents a number from 0 to 30.)

The compound represented by formula (D) shown below is a compound in which $R^1$ in the above formula (1) is a 3-butenyloxy group, namely an alkenyloxy group of four carbon atoms, and X is a linking group represented by the above formula (3) (wherein b is 1, Y is O (oxygen), and R is H).

[Chemical formula 10]

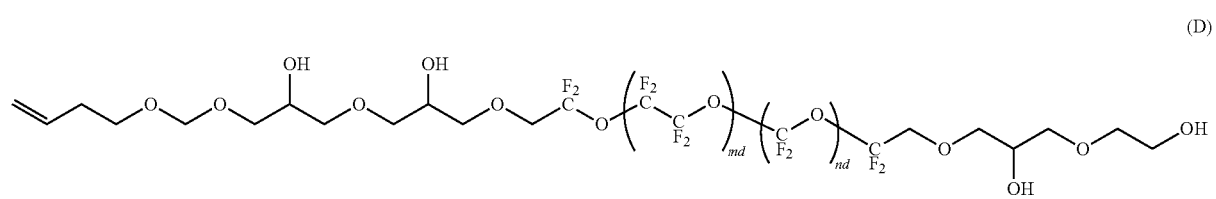
(D)

(In formula (D), md and nd indicate the average polymerization degree, wherein md represents a number from 1 to 30, and nd represents a number from 0 to 30.)

The compound represented by formula (E) shown below is a compound in which $R^1$ in the above formula (1) is a 3-butenyloxy group, namely an alkenyloxy group of four carbon atoms, and X is a linking group represented by the above formula (3) (wherein b is 2, Y is O (oxygen), and R is H).

[Chemical formula 11]

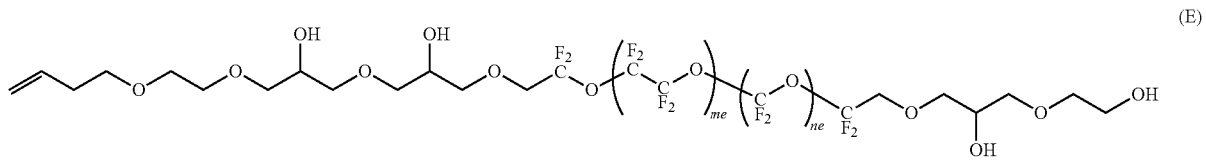

(E)

(In formula (E), me and ne indicate the average polymerization degree, wherein me represents a number from 1 to 30, and ne represents a number from 0 to 30.)

The compound represented by formula (F) shown below is a compound in which $R^1$ in the above formula (1) is a 3-butenyloxy group, namely an alkenyloxy group of four carbon atoms, and X is a linking group represented by the above formula (3) (wherein b is 3, Y is O (oxygen), and R is H).

[Chemical formula 12]

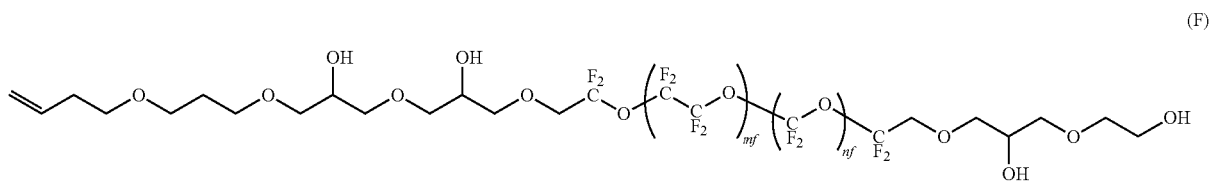

(F)

(In formula (F), mf and nf indicate the average polymerization degree, wherein mf represents a number from 1 to 30, and nf represents a number from 0 to 30.)

The compound represented by formula (G) shown below is a compound in which $R^1$ in the above formula (1) is an allyloxy group, namely an alkenyloxy group of three carbon atoms, and X is a linking group represented by the above formula (3) (wherein b is 1, Y is O (oxygen), and R is $CH_3$).

[Chemical formula 13]

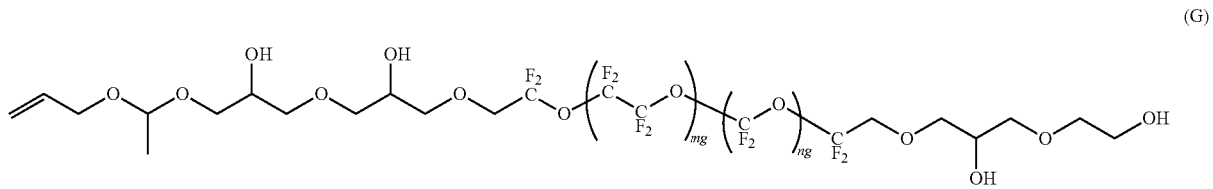

(G)

(In formula (G), mg and ng indicate the average polymerization degree, wherein mg represents a number from 1 to 30, and ng represents a number from 0 to 30.)

The compound represented by formula (H) shown below is a compound in which $R^1$ in the above formula (1) is an allyloxy group, namely an alkenyloxy group of three carbon atoms, and X is a linking group represented by the above formula (3) (wherein b is 1, Y is $CH_2$, and R is H).

[Chemical formula 14]

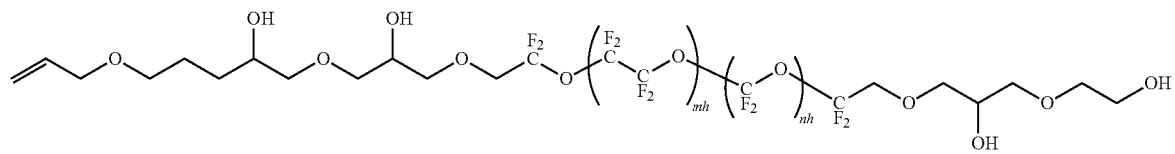

(H)

(In formula (H), mh and nh indicate the average polymerization degree, wherein mh represents a number from 1 to 30, and nh represents a number from 0 to 30.)

The compound represented by formula (I) shown below is a compound in which $R^1$ in the above formula (1) is an allyloxy group, namely an alkenyloxy group of three carbon atoms, and X is a linking group represented by the above formula (3) (wherein b is 2, Y is $CH_2$, and R is H).

[Chemical formula 15]

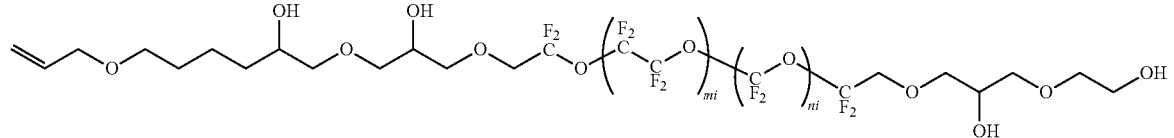

(I)

(In formula (I), mi and ni indicate the average polymerization degree, wherein mi represents a number from 1 to 30, and ni represents a number from 0 to 30.)

The compound represented by formula (J) shown below is a compound in which $R^1$ in the above formula (1) is a 3-butenyloxy group, namely an alkenyloxy group of four carbon atoms, and X is a linking group represented by the above formula (3) (wherein b is 1, Y is $CH_2$, and R is H).

[Chemical formula 16]

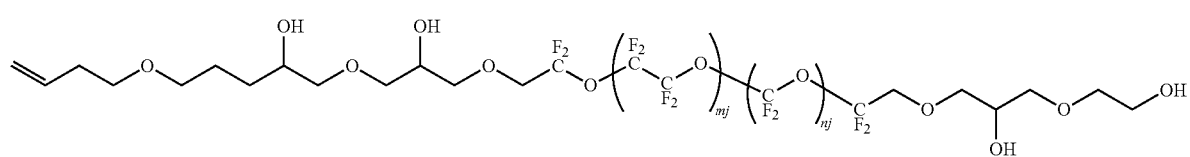

(J)

(In formula (J), mj and nj indicate the average polymerization degree, wherein mj represents a number from 1 to 30, and nj represents a number from 0 to 30.)

The compound represented by formula (K) shown below is a compound in which $R^1$ in the above formula (1) is a 3-butenyloxy group, namely an alkenyloxy group of four carbon atoms, and X is a linking group represented by the above formula (3) (wherein b is 2, Y is $CH_2$, and R is H).

[Chemical formula 17]

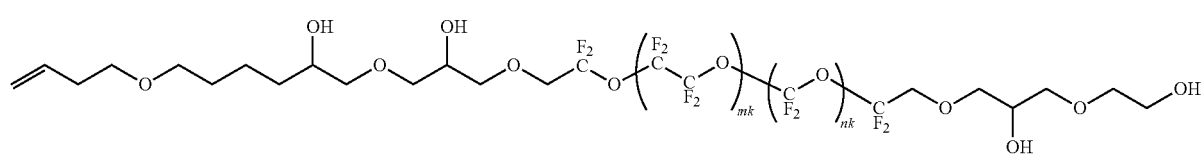

(K)

(In formula (K), mk and nk indicate the average polymerization degree, wherein nk represents a number from 1 to 30, and nk represents a number from 0 to 30.)

The compound represented by formula (M) shown below is a compound in which $R^1$ in the above formula (1) is an allyloxy group, namely an alkenyloxy group of three carbon atoms, X is a linking group represented by the above formula (3) (wherein b is 2, Y is O (oxygen), and R is H), $R^2$ is a linking group represented by the above formula (2) (wherein a is 2), $R^3$ is a PFPE chain represented by the above formula (4), and $R^4$ is a group represented by the above formula (7) (wherein g is 2 and h is 1).

[Chemical formula 18]

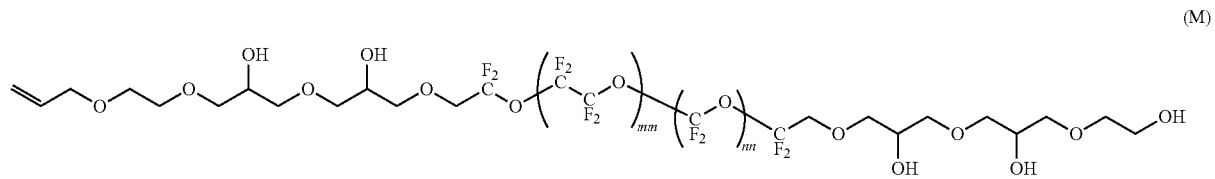

(M)

(In formula (M), mm and nm indicate the average polymerization degree, wherein mm represents a number from 1 to 30, and nm represents a number from 0 to 30.)

The compound represented by formula (N) shown below is a compound in which $R^1$ in the above formula (1) is a propargyloxy group, namely an alkynyloxy group of three carbon atoms, X is a linking group represented by the above formula (3) (wherein b is 2, Y is O (oxygen), and R is H), $R^2$ is a linking group represented by the above formula (2) (wherein a is 2), $R^3$ is a PFPE chain represented by the above formula (4), and $R^4$ is a group represented by the above formula (7) (wherein g is 1 and h is 1).

[Chemical formula 19]

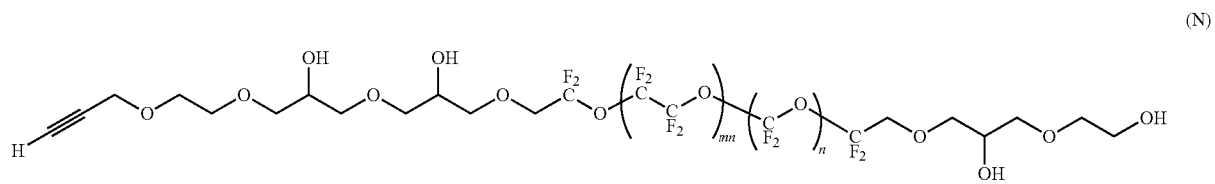

(N)

(In formula (N), mn and nn indicate the average polymerization degree, wherein mn represents a number from 1 to 30, and nn represents a number from 0 to 30.)

The compound represented by formula (O) shown below is a compound in which $R^1$ in the above formula (1) is an allyloxy group, namely an alkenyloxy group of three carbon atoms, X is a linking group represented by the above formula (3) (wherein b is 2, Y is O (oxygen), and R is H), $R^2$ is a linking group represented by the above formula (2) (wherein a is 2), $R^3$ is a group represented by the above formula (4) (wherein c is from 1 to 30 and d is 0), and $R^4$ is a group represented by the above formula (7) (wherein g is 1 and h is 1).

[Chemical formula 20]

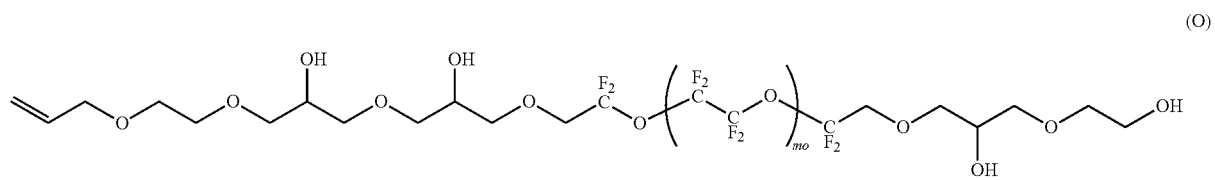

(O)

(In formula (O), mo indicates the average polymerization degree, and mo represents a number from 1 to 30.)

The compound represented by formula (P) shown below is a compound in which $R^1$ in the above formula (1) is an allyloxy group, namely an alkenyloxy group of three carbon atoms, X is a linking group represented by the above formula (3) (wherein b is 2, Y is O (oxygen), and R is H), $R^2$ is a linking group represented by the above formula (2) (wherein a is 2), $R^3$ is a group represented by the above formula (6) (wherein f is from 0.1 to 30), and $R^4$ is a group represented by the above formula (7) (wherein g is 1 and h is 1).

[Chemical formula 21]

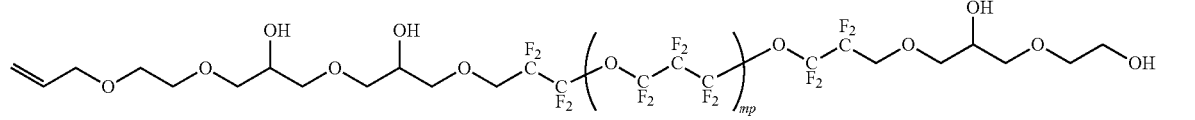

(P)

(In formula (P), mp indicates the average polymerization degree, and mp represents a number from 1 to 30.)

Further, mm to mo in formulas (M) to (O) represent c in formula (4), and nm and nn represent d in formula (4). Furthermore, mp in formula (P) represents f in formula (6).

The compound represented by formula (1) is preferably a compound represented by one of the above formulas (A) to (K) or (M) to (P), as the raw materials are readily available, and a lubricant layer can be formed that exhibits excellent wear resistance even when the layer is thin.

The fluorine-containing ether compound of the present embodiment preferably has a number average molecular weight (Mn) within a range from 500 to 10,000. When the number average molecular weight is at least 500, the lubricant containing the fluorine-containing ether compound of the present embodiment is more resistant to evaporation, meaning evaporation of the lubricant and subsequent migration to the magnetic head can be prevented. The number average molecular weight of the fluorine-containing ether compound is more preferably 1,000 or greater. Further, when the number average molecular weight is not more than 10,000, the viscosity of the fluorine-containing ether compound is appropriate, and a thin lubricant layer can be formed easily by application of the lubricant containing the fluorine-containing ether compound. In order to achieve a viscosity that facilitates handling when the fluorine-containing ether compound is used in a lubricant, the number average molecular weight of the fluorine-containing ether compound is preferably 3,000 or less.

The number average molecular weight (Mn) of the fluorine-containing ether compound refers to a value measured by $^1$H-NMR and $^{19}$F-NMR using an AVANCE III 400 device manufactured by Bruker BioSpin Corporation. In the NMR (nuclear magnetic resonance) measurement, the sample was diluted with a single solvent or mixed solvent containing hexafluorobenzene, d-acetone and/or d-tetrahydrofuran or the like prior to measurement. The standard used for the $^{19}$F-NMR chemical shift was the hexafluorobenzene peak at −164.7 ppm, whereas the standard used for the $^1$H-NMR chemical shift was the acetone peak at 2.2 ppm.

[Production Method]

There are no particular limitations on the method used for producing the fluorine-containing ether compound of the present embodiment, and production may be conducted using conventional production methods. For example, the fluorine-containing ether compound of the present embodiment may be produced using the production method described below.

First, a fluorine-based compound is prepared that has hydroxymethyl groups (—$CH_2OH$) at both terminals of a perfluoropolyether chain that corresponds with $R^3$ in formula (1).

Next, the hydroxyl group of the hydroxymethyl group at one terminal of the above fluorine-based compound is substituted with a group formed from —$R^4$ in formula (1) (the first reaction). Subsequently, the hydroxyl group of the hydroxymethyl group at the other terminal is substituted with a group formed from $R^1$—X—$R^2$— in formula (1) (the second reaction).

The first reaction and the second reaction can be conducted using conventional methods, with the methods selected appropriately in accordance with the structures and the like of $R^1$, $R^2$, $R^4$ and X in formula (1). Further, either the first reaction or the second reaction may be conducted first.

The above method yields a compound represented by formula (1).

In an embodiment of the present invention, for example, when producing a fluorine-containing ether compound in which $R^4$ is represented by one of formulas (7) to (10), the hydroxyl group of the hydroxymethyl group at one terminal of the above fluorine-based compound is preferably reacted with an epoxy compound corresponding with one of formulas (7) to (10) in the first reaction. In order to introduce a group formed from $R^1$—X—$R^2$— into the fluorine-based compound in the second reaction, the hydroxyl group of the hydroxymethyl group at one terminal of the fluorine-based compound is preferably reacted with an epoxy compound corresponding with $R^1$—X—$R^2$—.

Examples of compounds that can be used as the epoxy compound include compounds synthesized by reacting an alcohol having a structure that corresponds with the terminal represented by $R^1$—X or $R^4$ in the fluorine-containing ether compound being produced with a compound having an epoxy group selected from among epichlorohydrin, epibromohydrin and 2-bromoethyloxirane. These types of epoxy compounds may also be synthesized by oxidizing an unsaturated bond, or may be procured commercially.

The fluorine-containing ether compound of the present embodiment is a compound represented by formula (1) shown above. Accordingly, when a lubricant layer is formed on a protective layer using a lubricant containing this compound, the surface of the protective layer is coated with the PFPE chain represented by $R^3$ in formula (1), and frictional force between the magnetic head and the protective layer is reduced.

Further, in the fluorine-containing ether compound of the present embodiment, the existence of the group represented by X means that the distance between the double bond or triple bond in $R^1$ and the hydroxyl group(s) in $R^2$ is appropriate. As a result, in a lubricant layer formed using a lubricant containing the fluorine-containing ether compound of the present embodiment, there is an appropriate level of intramolecular interaction between the terminal group represented by $R^1$ and the one or more hydroxyl groups in $R^2$, enabling excellent wear resistance to be achieved.

Further, with the fluorine-containing ether compound of the present embodiment, as a result of the bonding between the protective layer and the hydroxyl group(s) in $R^2$ and the polar groups in $R^4$ that are linked to the terminals of the PFPE chain, the PFPE chain is adhered tightly to the protective layer. Accordingly, by using the fluorine-containing ether compound of the present embodiment, the lubricant layer and the protective layer are bound strongly together, and a lubricant layer having excellent wear resistance is obtained.

[Lubricant for Magnetic Recording Medium]

A lubricant for a magnetic recording medium according to an embodiment of the present invention contains the fluorine-containing ether compound represented by formula (1).

In the lubricant of this embodiment, conventional materials typically used as lubricant materials may be added and mixed as required, provided that the properties achieved as a result of including the fluorine-containing ether compound represented by formula (1) are not impaired.

Specific examples of these conventional materials include FOMBLIN (a registered trademark) ZDIAC, FOMBLIN ZDEAL and FOMBLIN AM-2001 (all manufactured by Solvay Solexis S.A.), and Moresco A20H (manufactured by Moresco Corporation). Conventional materials that are mixed and used with the lubricant of the present embodiment preferably have a number average molecular weight of 1,000 to 10,000.

In those cases where the lubricant of the present embodiment contains materials other than the fluorine-containing ether compound represented by formula (1), the amount of the fluorine-containing ether compound represented by formula (1) within the lubricant of the present embodiment is preferably at least 50% by mass, and more preferably 70% by mass or greater.

Because the lubricant of the present embodiment contains the fluorine-containing ether compound represented by formula (1), the surface of the protective layer can be coated with a high coverage rate, and a lubricant layer having excellent adhesion to the protective layer can be formed, even if the thickness is reduced. Accordingly, by using the lubricant of the present embodiment, a lubricant layer having excellent wear resistance can be obtained, even when the layer is thin.

Further, because the lubricant of the present embodiment contains the fluorine-containing ether compound represented by formula (1), any fluorine-containing ether compound that exists in the lubricant layer without being adhered (adsorbed) to the protective layer is unlikely to undergo aggregation. As a result, problems caused by the fluorine-containing ether compound aggregating and adhering to the magnetic head as foreign matter (smear) can be prevented, and pickup is suppressed.

Furthermore, in the fluorine-containing ether compound represented by formula (1) contained in the lubricant of the present embodiment, the existence of the group represented by X means that the distance between the double bond or triple bond in $R^1$ and the hydroxyl group(s) in $R^2$ is appropriate, meaning there is an appropriate level of intramolecular interaction between the terminal group represented by $R^1$ and the hydroxyl group(s) in $R^2$, enabling a lubricant layer having excellent wear resistance to be obtained.

[Magnetic Recording Medium]

A magnetic recording medium according to an embodiment of the present invention contains at least a magnetic layer, a protective layer and a lubricant layer provided sequentially on a substrate.

In the magnetic recording medium of this embodiment, one or two or more base layers may be provided between the substrate and the magnetic layer if required. Further, an adhesive layer and/or a soft magnetic layer may be provided between the base layer and the substrate.

FIG. 1 is a schematic cross-sectional view illustrating one embodiment of the magnetic recording medium of the present invention.

The magnetic recording medium 10 of this embodiment has a structure in which an adhesive layer 12, a soft magnetic layer 13, a first base layer 14, a second base layer 15, a magnetic layer 16, a protective layer 17, and a lubricant layer 18 are provided in sequence on a substrate 11.

[Substrate]

Examples of materials that may be used as the substrate 11 include non-magnetic substrates having a film composed of NiP or a NiP alloy formed on a substrate composed of a metal or an alloy material such as Al or an Al alloy.

Further, non-magnetic substrates formed from non-metal materials such as glass, ceramic, silicon, silicon carbide, carbon or resin may be used as the substrate 11, and non-magnetic substrates having a film composed of NiP or a NiP alloy formed on a substrate formed from one of these non-metal materials may also be used.

[Adhesive Layer]

The adhesive layer 12 prevents any progression of corrosion of the substrate 11 that can occur when the substrate 11 is positioned in contact with the soft magnetic layer 13 that is provided on top of the adhesive layer 12.

The material for the adhesive layer 12 may be selected appropriately from among Cr, Cr alloys, Ti, Ti alloys, CrTi, NiAl, and AlRu alloys and the like. The adhesive layer 12 can be formed, for example, by a sputtering method.

[Soft Magnetic Layer]

The soft magnetic layer 13 preferably has a structure in which a first soft magnetic film, an intermediate layer formed from a Ru film, and a second soft magnetic film are stacked sequentially. In other words, the soft magnetic layer 13 preferably has a structure in which, by sandwiching an intermediate layer formed from a Ru film between two layers of soft magnetic film, the soft magnetic films above and below the intermediate layer are linked by antiferromagnetic coupling (AFC).

Examples of the materials for the first soft magnetic film and the second soft magnetic film include CoZrTa alloys and CoFe alloys.

One of Zr, Ta and Nb is preferably added to a CoFe alloy used in forming the first soft magnetic film and the second soft magnetic film. This promotes the amorphization of the first soft magnetic film and the second soft magnetic film, enables the orientation of the first base layer (seed layer) to be improved, and also enables a reduction in the floating height of the magnetic head.

The soft magnetic layer 13 can be formed, for example, by a sputtering method.

[First Base Layer]

The first base layer 14 is a layer for controlling the orientation and crystal size of the second base layer 15 and the magnetic layer 16 provided on top of the first base layer 14.

Examples of the first base layer 14 include a Cr layer, Ta layer, Ru layer, or a CrMo, CoW, CrW, CrV or CrTi alloy layer.

The first base layer 14 can be formed, for example, by a sputtering method.

[Second Base Layer]

The second base layer 15 is a layer that controls the orientation of the magnetic layer 16 to achieve a more favorable orientation. The second base layer 15 is preferably a layer formed from Ru or a Ru alloy.

The second base layer 15 may be composed of a single layer, or may be composed of a plurality of layers. When the second base layer 15 is composed of a plurality of layers, all of the layers may be formed from the same material, or at least one layer may be formed from a different material.

The second base layer 15 can be formed, for example, by a sputtering method.

[Magnetic Layer]

The magnetic layer 16 is formed from a magnetic film having an easy axis of magnetization that is oriented in either the perpendicular direction or the horizontal direction relative to the substrate surface. The magnetic layer 16 is a layer containing Co and Pt, and may also contain oxides, or Cr, B, Cu, Ta or Zr or the like in order to improve the SNR characteristics.

Examples of oxides that may be included in the magnetic layer 16 include $SiO_2$, SiO, $Cr_2O_3$, CoO, $Ta_2O_3$ and $TiO_2$.

The magnetic layer 16 may be composed of a single layer, or may be composed of a plurality of magnetic layers formed from materials having different compositions.

For example, in the case where the magnetic layer 16 is composed of three layers, consisting of a first magnetic layer, a second magnetic layer and a third magnetic layer stacked in that order from the lower side, the first magnetic layer preferably has a granular structure formed from a material containing Co, Cr and Pt, and also containing oxides. Examples of preferred oxides that may be included in the first magnetic layer include oxides of Cr, Si, Ta, Al, Ti, Mg and Co. Among these, oxides such as $TiO_2$, $Cr_2O_3$ and $SiO_2$ can be used particularly favorably. Further, the first magnetic layer is preferably formed from a composite oxide in which two or more oxides are added. Among such composite oxides, $Cr_2O_3$—$SiO_2$, $Cr_2O_3$—$TiO_2$, and $SiO_2$—$TiO_2$ and the like can be used particularly favorably.

The first magnetic layer may also contain, in addition to Co, Cr, Pt and the oxides, one or more elements selected from among B, Ta, Mo, Cu, Nd, W, Nb, Sm, Tb, Ru and Re.

The same materials as those used for the first magnetic layer can be used for the second magnetic layer. The second magnetic layer preferably has a granular structure.

The third magnetic layer preferably has a non-granular structure formed from a material containing Co, Cr and Pt, but containing no oxides. In addition to Co, Cr and Pt, the third magnetic layer may also contain one or more elements selected from among B, Ta, Mo, Cu, Nd, W, Nb, Sm, Tb, Ru, Re and Mn.

In those cases where the magnetic layer 16 is composed of a plurality of magnetic layers, a non-magnetic layer is preferably provided between adjacent magnetic layers. When the magnetic layer 16 is composed of three layers, namely a first magnetic layer, a second magnetic layer and a third magnetic layer, a non-magnetic layer is preferably provided between the first magnetic layer and the second magnetic layer, and between the second magnetic layer and the third magnetic layer.

Examples of materials that may be used favorably for the non-magnetic layers provided between the adjacent magnetic layers of the magnetic layer 16 include Ru, Ru alloys, CoCr alloys, and CoCrX1 alloys (wherein X1 represents one element, or two or more elements, selected from among Pt, Ta, Zr, Re, Ru, Cu, Nb, Ni, Mn, Ge, Si, O, N, W, Mo, Ti, V and B) and the like.

Alloy materials containing oxides, metal nitrides or metal carbides are preferably used for the non-magnetic layers provided between the adjacent magnetic layers of the magnetic layer 16. Specific examples of oxides that may be used include $SiO_2$, $Al_2O_3$, $Ta_2O_5$, $Cr_2O_3$, MgO, $Y_2O_3$ and $TiO_2$. Examples of metal nitrides that may be used include ALN, $Si_3N_4$, TaN and CrN. Examples of metal carbides that may be used include TaC, BC and SiC.

The non-magnetic layers may be formed, for example, by a sputtering method.

In order to achieve a higher recording density, the magnetic layer 16 is preferably a magnetic layer for perpendicular magnetic recording in which the easy axis of magnetization is oriented in a direction perpendicular to the substrate surface. However, a magnetic layer for in-plane magnetic recording may also be used for the magnetic layer 16.

The magnetic layer 16 may be formed using any conventional method such as a vapor deposition method, ion beam sputtering method or magnetron sputtering method. The magnetic layer 16 is usually formed by a sputtering method.

[Protective Layer]

The protective layer 17 is a layer for protecting the magnetic layer 16. The protective layer 17 may be composed of a single layer, or may be composed of a plurality of layers. Examples of the material for the protective layer 17 include carbon, carbon which contains nitrogen, and silicon carbide.

A carbon-based protective layer can be used favorably as the protective layer 17, and an amorphous carbon protective layer is particularly preferred. When the protective layer 17 is a carbon protective layer, the interactions with the polar groups (and particularly hydroxyl groups) contained in the fluorine-containing ether compound included in the lubricant layer 18 can be further enhanced, which is desirable.

The adhesive strength between the carbon-based protective layer and the lubricant layer 18 can be controlled by using a hydrogenated carbon and/or nitrogenated carbon for the carbon-based protective layer, and then adjusting the hydrogen content and/or nitrogen content in the carbon-based protective layer. The hydrogen content in the carbon-based protective layer, when measured by hydrogen forward scattering spectrometry (HFS), is preferably within a range from 3 to 20 atomic %. Further, the nitrogen content in the carbon-based protective layer, when measured by X-ray photoelectron spectroscopy (XPS), is preferably within a range from 4 to 15 atomic %.

The hydrogen and/or nitrogen contained in the carbon-based protective layer need not necessarily be distributed uniformly through the entire carbon-based protective layer. For example, the carbon-based protective layer preferably has a composition gradient in which the nitrogen is incorporated in the protective layer 17 near the lubricant layer 18 and the hydrogen is incorporated in the protective layer 17 near the magnetic layer 16. In this case, the adhesive strength between the carbon-based protective layer and the magnetic layer 16 and lubricant layer 18 can be further improved.

The thickness of the protective layer 17 is preferably within a range from 1 nm to 7 nm. When the thickness of the protective layer 17 is at least 1 nm, satisfactory performance as the protective layer 17 can be achieved. Ensuring the thickness of the protective layer 17 is not more than 7 nm is preferable from the viewpoint of keeping the protective layer 17 thin.

Examples of the method used for forming the protective layer 17 include sputtering methods using a target material containing carbon, CVD (chemical vapor deposition) methods using a hydrocarbon raw material such as ethylene or toluene, and IBD (ion beam deposition) methods.

In those cases where a carbon-based protective layer is formed as the protective layer 17, the protective layer can be formed, for example, using a DC magnetron sputtering method. In particular, when forming a carbon-based protective layer as the protective layer 17, deposition of an amorphous carbon protective layer using a plasma CVD method is preferred. An amorphous carbon protective layer formed by a plasma CVD method has a uniform surface with very little roughness.

[Lubricant Layer]

The lubricant layer 18 prevents contamination of the magnetic recording medium 10. Further, the lubricant layer 18 also reduces the frictional force of the magnetic head of the magnetic recording and playback device that slides across the top of the magnetic recording medium 10, and improves the durability of the magnetic recording medium 10.

As illustrated in FIG. 1, the lubricant layer 18 is formed so as to contact the protective layer 17. The lubricant layer 18 contains the fluorine-containing ether compound described above.

In those cases where the protective layer 17 disposed beneath the lubricant layer 18 is a carbon-based protective layer, the lubricant layer 18 bonds to the protective layer 17 with a particularly powerful bonding strength. As a result, even if the thickness of the lubricant layer 18 is reduced, a magnetic recording medium 10 in which the surface of the protective layer 17 is coated with a high coverage rate can be obtained easily, and contamination of the surface of the magnetic recording medium 10 can be effectively prevented.

The average thickness of the lubricant layer 18 is preferably within a range from 0.5 nm (5 Å) to 2 nm (20 Å), and more preferably from 0.5 nm (5 Å) to 1 nm (10 Å). When the average thickness of the lubricant layer 18 is at least 0.5 nm, the lubricant layer 18 is formed with uniform thickness without becoming an island-like or mesh-like layer. As a result, the surface of the protective layer 17 can be coated with the lubricant layer 18 with a high coverage rate. Further, by ensuring that the average thickness of the lubricant layer 18 is not more than 2 nm, the lubricant layer 18 can be kept suitably thin, and the floating height of the magnetic head can be satisfactorily reduced.

When the surface of the protective layer 17 is not coated with the lubricant layer 18 with a satisfactorily high coverage rate, environmental substances adsorbed to the surface of the magnetic recording medium 10 can pass through voids in the lubricant layer 18 and penetrate beneath the lubricant layer 18. Environmental substances that penetrate beneath the lubricant layer 18 can adsorb and bond to the protective layer 17, producing contaminants. Then, during magnetic recording or playback, these contaminants (aggregated components) can adhere (transfer) to the magnetic head as smears, and may cause damage to the magnetic head, or cause a deterioration in the magnetic recording and playback characteristics of the magnetic recording and playback device.

Examples of environmental substances that produce contaminants include siloxane compounds (cyclic siloxanes and linear siloxanes), ionic impurities, hydrocarbons having comparatively large molecular weights such as octacosane, and plasticizers such as dioctyl phthalate. Examples of metal ions that may be incorporated in the ionic impurities include sodium ions and potassium ions. Examples of inorganic ions that may be incorporated in the ionic impurities include chloride ions, bromide ions, nitrate ions, sulfate ions and ammonium ions. Examples of organic ions that may be incorporated in the ionic impurities include oxalate ions and formate ions.

[Lubricant Layer Formation Method]

One example of the method used for forming the lubricant layer 18 is a method in which a partially produced magnetic recording medium is first prepared having each of the layers up to and including the protective layer 17 formed on the substrate 11, and a solution for forming the lubricant layer is then applied to the protective layer 17 and dried.

The solution for forming the lubricant layer is obtained, for example, by dispersing or dissolving the magnetic recording medium lubricant of the embodiment described above in a solvent as required, so as to achieve a viscosity and concentration that are suitable for the coating method being used.

Examples of the solvent used in the solution for forming the lubricant layer include fluorine-based solvents such as Vertrel (a registered trademark) XF (a product name, manufactured by Mitsui DuPont Fluorochemicals Co., Ltd.) and the like.

There are no particular limitations on the coating method used for applying the solution for forming the lubricant layer, and examples include spin-coating methods, spray methods, paper coating methods, and dipping methods.

When a dipping method is used, for example, the method described below may be used. First, the substrate 11 having the various layers up to and including the protective layer 17 formed thereon is dipped in the solution for forming the lubricant layer housed in the dipping tank of a dip coating device. Subsequently, the substrate 11 is pulled up out of the dipping tank at a prescribed speed.

This coats the solution for forming the lubricant layer onto the protective layer 17 of the substrate 11.

By using a dipping method, the solution for forming the lubricant layer can be applied uniformly to the surface of the protective layer 17, enabling the lubricant layer 18 to be formed with a uniform thickness on the protective layer 17.

In the present embodiment, the substrate 11 having the lubricant layer 18 formed thereon is preferably subjected to a heat treatment. Conducting a heat treatment improves the closeness of the adhesion between the lubricant layer 18 and the protective layer 17, and increases the adhesive strength between the lubricant layer 18 and the protective layer 17.

The heat treatment temperature is preferably within a range from 100 to 180° C. When the heat treatment temperature is at least 100° C., a satisfactory improvement in the adhesion between the lubricant layer 18 and the protective layer 17 can be achieved. Further, when the heat treatment temperature is not more than 180° C., thermal degradation of the lubricant layer 18 can be prevented. The heat treatment time is preferably within a range from 10 to 120 minutes.

The magnetic recording medium 10 of the present embodiment has at least the magnetic layer 16, the protective layer 17 and the lubricant layer 18 provided sequentially on the substrate 11. In the magnetic recording medium 10 of the present embodiment, the lubricant layer 18 containing the fluorine-containing ether compound described above is formed so as to contact the protective layer 17. Even if the thickness of this lubricant layer 18 is reduced, the surface of the protective layer 17 can be coated with a high coverage rate.

Accordingly, in the magnetic recording medium 10 of the present embodiment, the problem of environmental substances that can produce contaminants such as ionic impurities penetrating through voids in the lubricant layer 18 can be prevented. Accordingly, the magnetic recording medium 10 of the present embodiment is a medium in which few contaminants exist on the surface. Further, the lubricant layer 18 in the magnetic recording medium 10 of the present embodiment is less likely to produce foreign matter (smear), and can suppress pickup. Furthermore, the lubricant layer 18 in the magnetic recording medium 10 of the present embodiment has excellent wear resistance. As a result, the magnetic recording medium 10 of the present embodiment has excellent reliability and durability.

[Chemical formula 23]

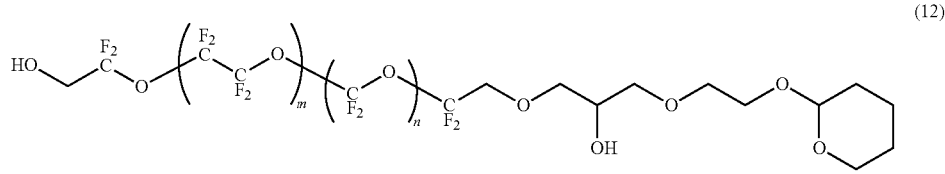

(12)

(In formula (12), the average polymerization degree indicated by m is 4.5, and the average polymerization degree indicated by n is 4.5.)

EXAMPLES

The present invention is described below in further detail using a series of examples and comparative examples. However, the present invention is not limited solely to the following examples.

[Production of Lubricant]

Example 1

A compound represented by the above formula (A) was produced using the method described below.

A 100 mL round-bottom flask was charged, under a nitrogen gas atmosphere, with 40 g of a compound represented by $HOCH_2CF_2O(CF_2CF_2O)_m(CF_2O)_nCF_2CH_2OH$ (wherein the average polymerization degree indicated by m in the formula is 4.5, and the average polymerization degree indicated by n in the formula is 4.5) (number average molecular weight: 1,000, molecular weight distribution: 1.1), 4.9 g of a compound represented by formula (11) shown below (molecular weight: 202.3, 24 mmol) and 38 mL of t-butanol, and the contents were stirred at room temperature until a uniform mixture was obtained. Subsequently, 1.4 g of potassium tert-butoxide (molecular weight: 112.21, 12 mmol) was added to the uniform liquid, and the resulting mixture was reacted under stirring at 70° C. for 16 hours.

The compound represented by formula (11) was synthesized by oxidizing a compound prepared by protecting ethylene glycol monoallyl ether using dihydropyran.

[Chemical formula 22]

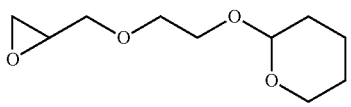

(11)

The reaction product obtained following the above reaction was cooled to 25° C., transferred to a separating funnel containing 100 mL of water, and extracted three times into 100 mL portions of ethyl acetate. The organic layer was washed with water and dried over anhydrous sodium sulfate. Following removal of the desiccant by filtration, the filtrate was concentrated, and the residue was purified by silica gel column chromatography, yielding 19.2 g of a compound represented by formula (12) shown below as an intermediate (molecular weight: 1202.3, 15.9 mmol).

A 100 mL round-bottom flask was charged, under a nitrogen gas atmosphere, with 5.95 g of the compound represented by formula (12) obtained as an intermediate in the above reaction (molecular weight: 1202.3, 5.0 mmol), 1.51 g of a compound represented by formula (13) shown below (molecular weight: 276.3, 5.5 mmol) and 2.4 mL of t-butanol, and the contents were stirred at room temperature until a uniform mixture was obtained. Subsequently, 1.87 g of potassium tert-butoxide (molecular weight: 112.21, 25.2 mmol) was added to the uniform liquid, and the resulting mixture was reacted under stirring at 70° C. for 22.5 hours.

[Chemical formula 24]

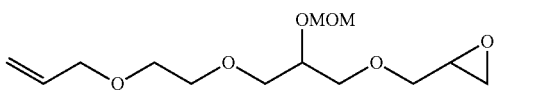

(13)

(In formula (13), MOM represents a methoxymethyl group.)

The compound represented by formula (13) was synthesized using the method described below. First, epibromohydrin was reacted with the primary hydroxyl group of ethylene glycol monoallyl ether, and the thus obtained compound was reacted with sulfuric acid to obtain a dialcohol. The primary hydroxyl group of the thus obtained dialcohol was protected with a t-butyldimethylsilyl group using t-butyldimethylsilyl chloride, and the secondary hydroxyl group was then protected with a methoxymethyl (MOM) group using methoxymethyl chloride. The t-butyldimethylsilyl group was removed from the thus obtained compound, and epibromohydrin was reacted with the thus produced primary hydroxyl group. By following these steps, the compound represented by formula (13) was obtained.

The reaction liquid following the above reaction was returned to room temperature, 26 g of a 10% hydrogen chloride methanol solution was added, and the resulting mixture was stirred at room temperature for 3.5 hours. The reaction liquid was transferred gradually to a separating funnel containing 100 mL of a saline solution, and then extracted twice into 200 mL portions of ethyl acetate. The organic layer was washed sequentially with 100 mL of a saline solution, 100 mL of a saturated sodium bicarbonate solution and 100 mL of a saline solution, and was then dried over anhydrous sodium sulfate. Following removal of the desiccant by filtration, the filtrate was concentrated, and the residue was purified by silica gel column chromatography, yielding 4.41 g of the compound (A) (wherein in formula (A), the average polymerization degree indicated by ma was 4.5, and the average polymerization degree indicated by na was 4.5) (molecular weight: 1350, 3.3 mmol).

A $^1$H-NMR measurement of the obtained compound (A) was conducted, and the structure was identified based on the following results.

Compound (A): $^1$H-NMR (CD$_3$COCD$_3$):

δ [ppm] 3.45 to 3.76 (21H), 3.85 to 4.00 (6H), 4.07 to 4.14 (6H), 5.10 to 5.13 (1H), 5.28 to 5.29 (1H), 5.85 to 5.95 (1H)

Example 2

With the exception of using 1.44 g of a compound represented by formula (14) shown below instead of the compound represented by formula (13), the same operations as Example 1 were conducted, yielding 4.41 g of a compound represented by the above formula (B) (wherein in formula (B), the average polymerization degree indicated by mb was 4.5, and the average polymerization degree indicated by nb was 4.5).

The compound represented by formula (14) was synthesized using the same operations as those used for the compound represented by formula (13), with the exception of using a compound represented by formula (15) shown below instead of the ethylene glycol monoallyl ether.

[Chemical formula 25]

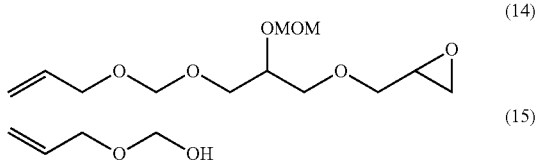

(14)

(15)

(In formula (14), MOM represents a methoxymethyl group.)

A $^1$H-NMR measurement of the obtained compound (B) was conducted, and the structure was identified based on the following results.

Compound (B): $^1$H-NMR (CD$_3$COCD$_3$):

δ [ppm] 3.42 to 4.17 (31H), 5.11 to 5.12 (1H), 5.27 to 5.29 (1H), 5.84 to 5.95 (1H)

Example 3

With the exception of using 1.60 g of a compound represented by formula (16) shown below instead of the compound represented by formula (13), the same operations as Example 1 were conducted, yielding 4.51 g of a compound represented by the above formula (C) (wherein in formula (C), the average polymerization degree indicated by me was 4.5, and the average polymerization degree indicated by nc was 4.5).

The compound represented by formula (16) was synthesized using the same operations as those used for the compound represented by formula (13), with the exception of using a compound represented by formula (17) shown below instead of the ethylene glycol monoallyl ether.

[Chemical formula 26]

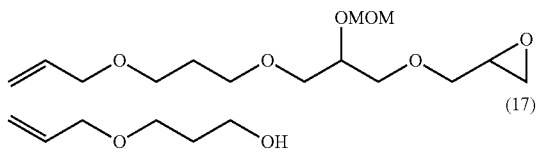

(16)

(17)

(In formula (16), MOM represents a methoxymethyl group.)

A $^1$H-NMR measurement of the obtained compound (C) was conducted, and the structure was identified based on the following results.

Compound (C): $^1$H-NMR (CD$_3$COCD$_3$):

δ [ppm] 1.42 to 1.51 (2H), 3.44 to 4.12 (33H), 5.09 to 5.12 (1H), 5.28 to 5.29 (1H), 5.85 to 5.96 (1H)

Example 4

With the exception of using 1.52 g of a compound represented by formula (18) shown below instead of the compound represented by formula (13), the same operations as Example 1 were conducted, yielding 4.46 g of a compound represented by the above formula (D) (wherein in formula (D), the average polymerization degree indicated by md was 4.5, and the average polymerization degree indicated by nd was 4.5).

The compound represented by formula (18) was synthesized using the same operations as those used for the compound represented by formula (13), with the exception of using an alcohol synthesized from methylene glycol and 4-bromo-1-butene instead of the ethylene glycol monoallyl ether.

[Chemical formula 27]

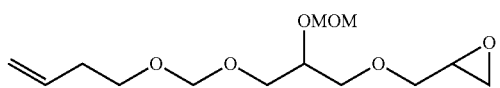

(18)

(In formula (18), MOM represents a methoxymethyl group.)

A $^1$H-NMR measurement of the obtained compound (D) was conducted, and the structure was identified based on the following results.

Compound (D): $^1$H-NMR (CD$_3$COCD$_3$):

δ [ppm] 2.34 to 2.40 (2H), 3.44 to 4.20 (31H), 5.09 to 5.13 (1H), 5.28 to 5.30 (1H), 5.85 to 5.97 (1H)

Example 5

With the exception of using 1.60 g of a compound represented by formula (19) shown below instead of the compound represented by formula (13), the same operations as Example 1 were conducted, yielding 4.50 g of a compound represented by the above formula (E) (wherein in formula (E), the average polymerization degree indicated by me was 4.5, and the average polymerization degree indicated by ne was 4.5).

The compound represented by formula (19) was synthesized using the same operations as those used for the compound represented by formula (13), with the exception of using a compound represented by formula (20) shown below instead of the ethylene glycol monoallyl ether.

[Chemical formula 28]

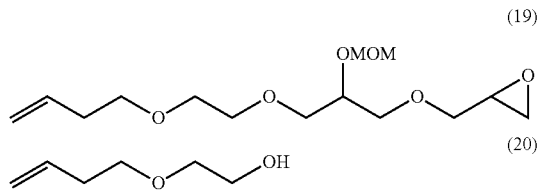

(19)

(20)

(In formula (19), MOM represents a methoxymethyl group.)

A $^1$H-NMR measurement of the obtained compound (E) was conducted, and the structure was identified based on the following results.

Compound (E): $^1$H-NMR (CD$_3$COCD$_3$):

δ [ppm] 2.31 to 2.38 (2H), 3.42 to 4.16 (33H), 5.10 to 5.12 (1H), 5.29 to 5.31 (1H), 5.82 to 5.92 (1H)

Example 6

With the exception of using 1.67 g of a compound represented by formula (21) shown below instead of the compound represented by formula (13), the same operations as Example 1 were conducted, yielding 4.54 g of a compound represented by the above formula (F) (wherein in formula (F), the average polymerization degree indicated by mf was 4.5, and the average polymerization degree indicated by nf was 4.5).

The compound represented by formula (21) was synthesized using the same operations as those used for the compound represented by formula (13), with the exception of using a compound represented by formula (22) shown below instead of the ethylene glycol monoallyl ether.

[Chemical formula 29]

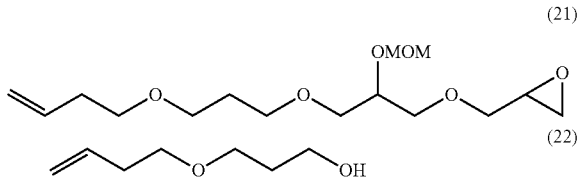

(21)

(22)

(In formula (21), MOM represents a methoxymethyl group.)

A $^1$H-NMR measurement of the obtained compound (F) was conducted, and the structure was identified based on the following results.

Compound (F): $^1$H-NMR (CD$_3$COCD$_3$):

δ [ppm] 1.47 to 1.52 (2H), 2.32 to 2.41 (2H), 3.42 to 4.19 (33H), 5.10 to 5.11 (1H), 5.25 to 5.29 (1H), 5.85 to 5.97 (1H)

Example 7

With the exception of using 1.52 g of a compound represented by formula (23) shown below instead of the compound represented by formula (13), the same operations as Example 1 were conducted, yielding 4.46 g of a compound represented by the above formula (G) (wherein in formula (G), the average polymerization degree indicated by mg was 4.5, and the average polymerization degree indicated by ng was 4.5).

The compound represented by formula (23) was synthesized using the same operations as those used for the compound represented by formula (13), with the exception of using a compound represented by formula (24) shown below instead of the ethylene glycol monoallyl ether.

[Chemical formula 30]

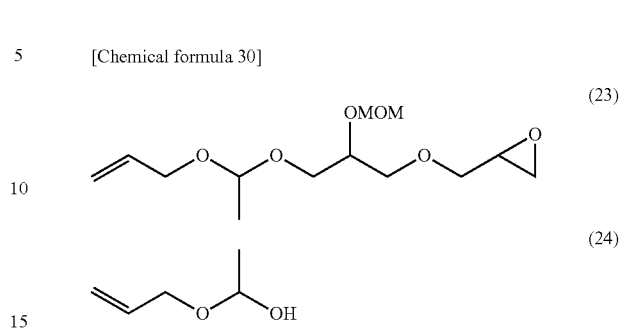

(23)

(24)

(In formula (23), MOM represents a methoxymethyl group.)

A $^1$H-NMR measurement of the obtained compound (G) was conducted, and the structure was identified based on the following results.

Compound (G): $^1$H-NMR (CD$_3$COCD$_3$):

δ [ppm] 3.41 to 4.13 (33H), 5.12 to 5.14 (1H), 5.26 to 5.28 (1H), 5.82 to 5.94 (1H)

Example 8

With the exception of using 1.43 g of a compound represented by formula (25) shown below instead of the compound represented by formula (13), the same operations as Example 1 were conducted, yielding 4.42 g of a compound represented by the above formula (H) (wherein in formula (H), the average polymerization degree indicated by mh was 4.5, and the average polymerization degree indicated by nh was 4.5).

The compound represented by formula (25) was synthesized using the method described below. First, a compound represented by formula (26) shown below was reacted with the primary hydroxyl group of allyl alcohol, and the thus obtained compound was reacted with sulfuric acid to obtain a dialcohol. The primary hydroxyl group of the thus obtained dialcohol was protected with a t-butyldimethylsilyl group using t-butyldimethylsilyl chloride, and the secondary hydroxyl group was then protected with a methoxymethyl (MOM) group using methoxymethyl chloride. Subsequently, the t-butyldimethylsilyl group was removed from the thus obtained compound, and epibromohydrin was reacted with the thus produced primary hydroxyl group to complete the synthesis.

[Chemical formula 31]

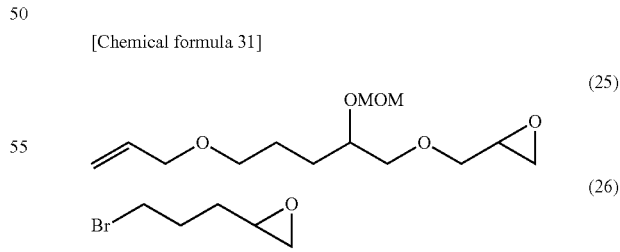

(25)

(26)

(In formula (25), MOM represents a methoxymethyl group.)

A $^1$H-NMR measurement of the obtained compound (H) was conducted, and the structure was identified based on the following results.

Compound (H): $^1$H-NMR (CD$_3$COCD$_3$):

δ [ppm] 1.56 to 1.78 (2H), 3.43 to 4.16 (31H), 5.11 to 5.12 (1H), 5.26 to 5.27 (1H), 5.83 to 5.93 (1H)

Example 9

With the exception of using 1.51 g of a compound represented by formula (27) shown below instead of the compound represented by formula (13), the same operations as Example 1 were conducted, yielding 4.44 g of a compound represented by the above formula (I) (wherein in formula (I), the average polymerization degree indicated by mi was 4.5, and the average polymerization degree indicated by ni was 4.5).

The compound represented by formula (27) was synthesized using the method described below. First, a compound represented by formula (28) shown below was reacted with the primary hydroxyl group of allyl alcohol, and the thus obtained compound was reacted with sulfuric acid to obtain a dialcohol. The primary hydroxyl group of the thus obtained dialcohol was protected with a t-butyldimethylsilyl group using t-butyldimethylsilyl chloride, and the secondary hydroxyl group was then protected with a methoxymethyl (MOM) group using methoxymethyl chloride. Subsequently, the t-butyldimethylsilyl group was removed from the thus obtained compound, and epibromohydrin was reacted with the thus produced primary hydroxyl group to complete the synthesis.

[Chemical formula 32]

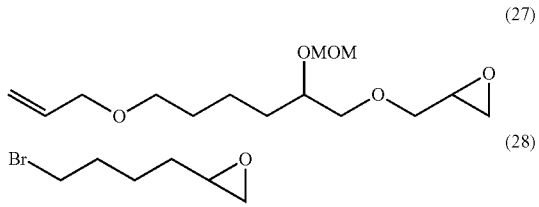

(27)

(28)

(In formula (27), MOM represents a methoxymethyl group.)

A $^1$H-NMR measurement of the obtained compound (I) was conducted, and the structure was identified based on the following results.

Compound (I): $^1$H-NMR (CD$_3$COCD$_3$):

δ [ppm] 1.36 to 1.76 (6H), 3.40 to 4.11 (29H), 5.11 to 5.14 (1H), 5.25 to 5.29 (1H), 5.85 to 5.95 (1H)

Example 10

With the exception of using 1.51 g of a compound represented by formula (29) shown below instead of the compound represented by formula (13), the same operations as Example 1 were conducted, yielding 4.45 g of a compound represented by the above formula (J) (wherein in formula (J), the average polymerization degree indicated by mj was 4.5, and the average polymerization degree indicated by nj was 4.5).

The compound represented by formula (29) was synthesized using the same operations as those used for the compound represented by formula (25), with the exception of using 3-buten-1-ol instead of allyl alcohol.

[Chemical formula 33]

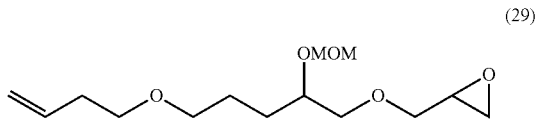

(29)

(In formula (29), MOM represents a methoxymethyl group.)

A $^1$H-NMR measurement of the obtained compound (J) was conducted, and the structure was identified based on the following results.

Compound (J): $^1$H-NMR (CD$_3$COCD$_3$):

δ [ppm] 1.36 to 1.66 (4H), 2.30 to 2.45 (2H), 3.47 to 4.22 (29H), 5.08 to 5.10 (1H), 5.27 to 5.28 (1H), 5.88 to 5.97 (1H)

Example 11

With the exception of using 1.59 g of a compound represented by formula (30) shown below instead of the compound represented by formula (13), the same operations as Example 1 were conducted, yielding 4.49 g of a compound represented by the above formula (K) (wherein in formula (K), the average polymerization degree indicated by mk was 4.5, and the average polymerization degree indicated by nk was 4.5).

The compound represented by formula (30) was synthesized using the same operations as those used for the compound represented by formula (27), with the exception of using 3-buten-1-ol instead of allyl alcohol.

[Chemical formula 34]

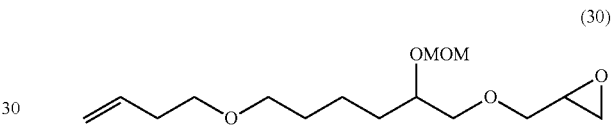

(30)

(In formula (30), MOM represents a methoxymethyl group.)

A $^1$H-NMR measurement of the obtained compound (K) was conducted, and the structure was identified based on the following results.

Compound (K): $^1$H-NMR (CD$_3$COCD$_3$):

δ [ppm] 1.36 to 1.70 (6H), 2.35 to 2.39 (2H), 3.40 to 4.14 (29H), 5.09 to 5.10 (1H), 5.27 to 5.28 (1H), 5.82 to 5.92 (1H)

Comparative Example 1

A compound represented by formula (L) shown below was synthesized using the method described below.

A 100 mL round-bottom flask was charged, under a nitrogen gas atmosphere, with 25.0 g of a compound represented by HOCH$_2$CF$_2$O(CF$_2$CF$_2$O)$_p$(CF$_2$O)$_q$CF$_2$CH$_2$OH (wherein the average polymerization degree indicated by p in the formula is 4.5, and the average polymerization degree indicated by q is 4.5) (number average molecular weight: 1,000, molecular weight distribution: 1.1), 2.82 g of a compound represented by formula (31) shown below and 24 mL of t-butanol, and the contents were stirred at room temperature until a uniform mixture was obtained. Subsequently, 0.840 g of potassium tert-butoxide was added to the uniform liquid, and the resulting mixture was reacted under stirring at 70° C. for 17 hours.

[Chemical formula 35]

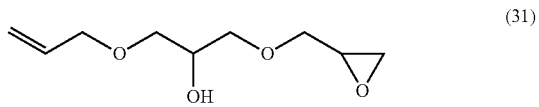

(31)

The reaction product obtained following the above reaction was cooled to 25° C., neutralized with 0.5 mol/L hydrochloric acid, and then extracted into Vertrel XF, manufactured by Mitsui DuPont Fluorochemicals Co., Ltd. (hereafter referred to as "Vertrel XF"), and the organic layer was then washed with water and dried over anhydrous sodium sulfate. Following removal of the desiccant by filtration, the filtrate was concentrated, and the residue was purified by silica gel column chromatography, yielding 11.8 g of a compound represented by formula (32) shown below.

[Chemical formula 36]

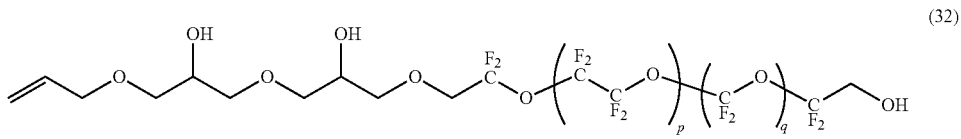

(32)

(In formula (32), the average polymerization degree indicated by p is 4.5, and the average polymerization degree indicated by q is 4.5.)

A 200 mL round-bottom flask was charged, under a nitrogen gas atmosphere, with 11.8 g of the above obtained compound represented by formula (32), 2.08 g of a compound represented by formula (33) shown below and 94 mL of t-BuOH, and the contents were stirred at room temperature until a uniform mixture was obtained. Subsequently, 0.56 g of t-BuOK was added to the uniform liquid, and the resulting mixture was reacted under stirring at 70° C. for 16 hours.

The thus obtained reaction product was cooled to 25° C., neutralized with 0.1 mol/L hydrochloric acid, and then extracted into Vertrel XF, and the organic layer was then washed with water and dried over anhydrous sodium sulfate. Following removal of the desiccant by filtration, the filtrate was concentrated.

[Chemical formula 37]

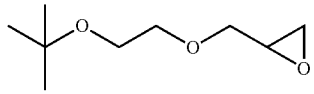

(33)

Subsequently, 2.3 mL of water and 15 mL of trifluoroacetic acid were added to the obtained residue, and the resulting mixture was stirred at room temperature for 6 hours. The water and trifluoroacetic acid were then removed by distillation at 35° C. or lower. Subsequently, 200 mL of 5% sodium bicarbonate solution was added to the obtained residue, this resulting mixture was extracted into Vertrel XF, and the organic layer was washed with water and concentrated. Next, 40 mL of methanol and 1.1 mL of a 1 mol/L aqueous solution of sodium hydroxide were added to the thus obtained residue, and the mixture was stirred at room temperature for one hour. The methanol was removed by distillation, the residue was extracted into Vertrel XF, and the organic layer was washed with water and dried over anhydrous sodium sulfate. Following removal of the desiccant by filtration, the filtrate was concentrated, and the residue was purified by silica gel column chromatography, yielding 9.54 g of a compound represented by formula (L) shown below.

[Chemical formula 38]

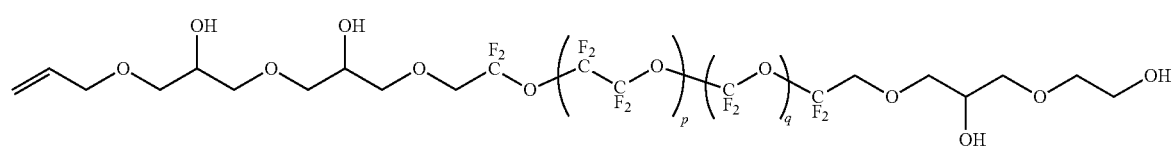

(L)

(In formula (L), the average polymerization degree indicated by p is 4.5, and the average polymerization degree indicated by q is 4.5.)

A $^1$H-NMR measurement of the obtained compound (L) was conducted, and the structure was identified based on the following results.

Compound (L): $^1$H-NMR (CD$_3$COCD$_3$):

δ [ppm] 3.35 to 3.95 (19H), 3.95 to 4.15 (6H), 5.05 to 5.15 (1H), 5.20 to 5.30 (1H), 5.80 to 6.00 (1H)

The structure of R$^1$, the value of a in formula (2), b, Y and R in formula (3), the structure of R$^3$ and the structure of R$^4$ when each of the compounds of Examples 1 to 11 and Comparative Example 1 obtained in the manner described above are applied to formula (1) are shown below in Table 1. Further, the number average molecular weight (Mn) of each of the compounds of Examples 1 to 11 and Comparative Example 1 was determined from the $^1$H-NMR measurement described above and a $^{19}$F-NMR measurement. Those results are also shown in Table 1.

Example 12

With the exception of using 1.60 g of a compound represented by formula (34) shown below instead of the compound represented by formula (11), the same operations as Example 1 were conducted, yielding 4.60 g of a compound represented by the above formula (M) (wherein in formula (M), the average polymerization degree indicated by mm was 4.5, and the average polymerization degree indicated by nm was 4.5).

The compound represented by formula (34) used in the above reaction was synthesized using the method described below. A tert-butyldimethylsilyl (TBS) group was introduced as a protective group at the primary hydroxyl group of 3-allyloxy-1,2-propanediol, and a methoxy methyl (MOM) group was then introduced as a protective group at the secondary hydroxyl group of the obtained compound. Subsequently, the TBS group was removed from the compound, and the thus produced primary hydroxyl group was reacted with 2-bromoethoxytetrahydropyran. The double bond of the resulting compound was then oxidized. These steps yielded the compound represented by formula (34).

TABLE 1

| | R$^1$ | b | X (formula 3) Y | R | a | R$^2$ (formula 2) R$^3$ | R$^4$ | Number average molecular weight (Mn) | Compound |
|---|---|---|---|---|---|---|---|---|---|
| Example 1 | allyloxy group | 2 | O | H | 2 | formula (4) c = 4.5 d = 4.5 | formula (7) g = 1 h = 1 | 1350 | (A) |
| Example 2 | allyloxy group | 1 | O | H | 2 | formula (4) c = 4.5 d = 4.5 | formula (7) g = 1 h = 1 | 1336 | (B) |
| Example 3 | allyloxy group | 3 | O | H | 2 | formula (4) c = 4.5 d = 4.5 | formula (7) g = 1 h = 1 | 1364 | (C) |
| Example 4 | 3-butenyloxy group | 1 | O | H | 2 | formula (4) c = 4.5 d = 4.5 | formula (7) g = 1 h = 1 | 1350 | (D) |
| Example 5 | 3-butenyloxy group | 2 | O | H | 2 | formula (4) c = 4.5 d = 4.5 | formula (7) g = 1 h = 1 | 1364 | (E) |
| Example 6 | 3-butenyloxy group | 3 | O | H | 2 | formula (4) c = 4.5 d = 4.5 | formula (7) g = 1 h = 1 | 1378 | (F) |
| Example 7 | allyloxy group | 1 | O | CH$_3$ | 2 | formula (4) c = 4.5 d = 4.5 | formula (7) g = 1 h = 1 | 1350 | (G) |
| Example 8 | allyloxy group | 1 | CH$_2$ | H | 2 | formula (4) c = 4.5 d = 4.5 | formula (7) g = 1 h = 1 | 1334 | (H) |
| Example 9 | allyloxy group | 2 | CH$_2$ | H | 2 | formula (4) c = 4.5 d = 4.5 | formula (7) g = 1 h = 1 | 1348 | (I) |
| Example 10 | 3-butenyloxy group | 1 | CH$_2$ | H | 2 | formula (4) c = 4.5 d = 4.5 | formula (7) g = 1 h = 1 | 1348 | (J) |
| Example 11 | 3-butenyloxy group | 2 | CH$_2$ | H | 2 | formula (4) c = 4.5 d = 4.5 | formula (7) g = 1 h = 1 | 1362 | (K) |
| Comparative Example 1 | allyloxy group | — | — | — | 2 | formula (4) c = 4.5 d = 4.5 | formula (7) g = 1 h = 1 | 1306 | (L) |

[Chemical formula 39]

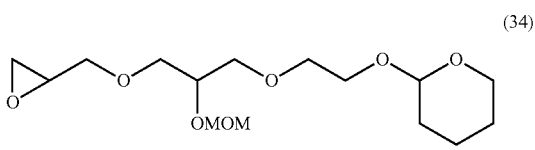

(34)

(In formula (34), MOM represents a methoxymethyl group.)

A $^1$H-NMR measurement of the obtained compound (M) was conducted, and the structure was identified based on the following results.

Compound (M): $^1$H-NMR (CD$_3$COCD$_3$): δ [ppm] 3.45 to 4.21 (39H), 5.10 to 5.13 (1H), 5.28 to 5.29 (1H), 5.85 to 5.95 (1H)

Example 13

With the exception of using 1.51 g of a compound represented by formula (35) shown below instead of the compound represented by formula (13), the same operations as Example 1 were conducted, yielding 4.45 g of a compound represented by the above formula (N) (wherein in formula (N), the average polymerization degree indicated by mn was 4.5, and the average polymerization degree indicated by nn was 4.5).

The compound represented by formula (35) was synthesized using the same operations as those used for the compound represented by formula (13), with the exception of using 2-(2-propynyloxy)ethanol instead of the ethylene glycol monoallyl ether.

[Chemical formula 40]

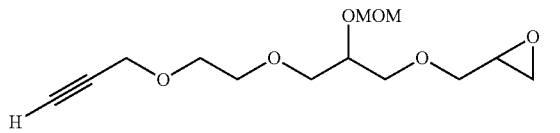

(35)

(In formula (35), MOM represents a methoxymethyl group.)

A $^1$H-NMR measurement of the obtained compound (N) was conducted, and the structure was identified based on the following results.

Compound (N): $^1$H-NMR (CD$_3$COCD$_3$):
δ [ppm] 2.48 (1H), 3.16 to 4.19 (33H)

Example 14

With the exception of using 40 g of a compound represented by the formula HOCH$_2$CF$_2$O(CF$_2$CF$_2$O)$_r$CF$_2$CH$_2$OH (wherein the average polymerization degree indicated by r in the formula is 7.1) instead of the compound represented by HOCH$_2$CF$_2$O(CF$_2$CF$_2$O)$_m$(CF$_2$O)$_n$CF$_2$CH$_2$OH (wherein the average polymerization degree indicated by m in the formula is 4.5, and the average polymerization degree indicated by n is 4.5), the same operations as Example 1 were conducted, yielding 4.41 g of a compound represented by the above formula (O) (wherein in formula (O), the average polymerization degree indicated by mo was 7.1).

A $^1$H-NMR measurement of the obtained compound (O) was conducted, and the structure was identified based on the following results.

Compound (O): $^1$H-NMR (CD$_3$COCD$_3$):
δ [ppm] 3.44 to 3.77 (21H), 3.83 to 4.01 (6H), 4.07 to 4.13 (6H), 5.10 to 5.13 (1H), 5.28 to 5.29 (1H), 5.85 to 5.94 (1H)

Example 15

With the exception of using 40 g of a compound represented by the formula HOCH$_2$CF$_2$CF$_2$(OCF$_2$CF$_2$CF$_2$)$_s$OCF$_2$CF$_2$CH$_2$OH (wherein the average polymerization degree indicated by s in the formula is 4.4) instead of the compound represented by HOCH$_2$CF$_2$O(CF$_2$CF$_2$O)$_m$(CF$_2$O)$_n$CF$_2$CH$_2$OH (wherein the average polymerization degree indicated by m in the formula is 4.5, and the average polymerization degree indicated by n is 4.5), the same operations as Example 1 were conducted, yielding 4.41 g of a compound represented by the above formula (P) (wherein in formula (P), the average polymerization degree indicated by mp was 4.4).

A $^1$H-NMR measurement of the obtained compound (P) was conducted, and the structure was identified based on the following results.

Compound (P): $^1$H-NMR (CD$_3$COCD$_3$):
δ [ppm] 3.46 to 3.76 (21H), 3.86 to 3.99 (6H), 4.08 to 4.14 (6H), 5.11 to 5.13 (1H), 5.27 to 5.29 (1H), 5.85 to 5.94 (1H)

The structure of R$^1$, the value of a in formula (2), b, Y and R in formula (3), the structure of R$^3$ and the structure of R$^4$ when each of the compounds of Examples 12 to 15 obtained in the manner described above are applied to formula (1) are shown below in Table 2. Further, the number average molecular weight (Mn) of each of the compounds of Examples 12 to 15 was determined from the $^1$H-NMR measurement described above and a $^{19}$F-NMR measurement. Those results are also shown in Table 2.

Comparative Example 2

A compound represented by formula (Q) shown below was synthesized using the method described below.

With the exception of using 1.60 g of the compound represented by formula (34) shown above instead of the compound represented by formula (33), the same operations as Comparative Example 1 were conducted, yielding 4.55 g of a compound represented by formula (Q) shown below (wherein in formula (Q), the average polymerization degree indicated by mq was 4.5, and the average polymerization degree indicated by nq was 4.5).

[Chemical formula 41]

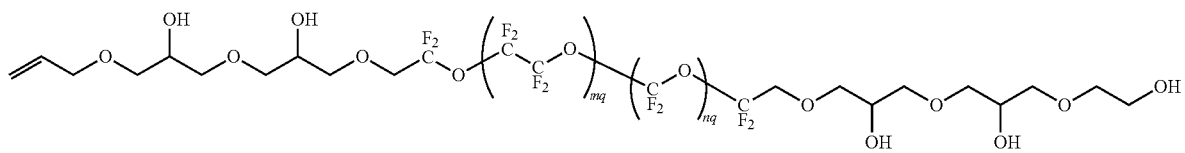

(Q)

A $^1$H-NMR measurement of the obtained compound (Q) was conducted, and the structure was identified based on the following results.
Compound (Q): $^1$H-NMR (CD$_3$COCD$_3$):
δ [ppm] 3.35 to 3.95 (35H), 5.05 to 5.16 (1H), 5.21 to 5.32 (1H), 5.80 to 5.99 (1H)

Comparative Example 3

A compound represented by formula (R) shown below was synthesized using the method described below.

With the exception of using 1.26 g of the compound represented by formula (36) shown above instead of the compound represented by formula (13), the same operations as Example 1 were conducted, yielding 4.30 g of a compound represented by formula (R) shown below (wherein in formula (R), the average polymerization degree indicated by mr was 4.5, and the average polymerization degree indicated by nr was 4.5).

The compound represented by formula (36) was synthesized using the following method. A methoxymethyl (MOM) group was introduced as a protective group at the secondary hydroxyl group of a compound obtained by reacting the primary hydroxyl group of 2-propyn-1-ol with allyl glycidyl ether. The double bond of the thus obtained compound was then oxidized to obtain the compound represented by formula (36).

[Chemical formula 42]

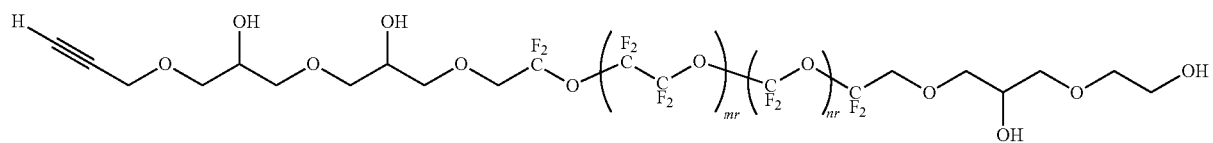

(36)

(In formula (36), MOM represents a methoxymethyl group.)

[Chemical formula 43]

(R)

A $^1$H-NMR measurement of the obtained compound (R) was conducted, and the structure was identified based on the following results.
Compound (R): $^1$H-NMR (CD$_3$COCD$_3$):
δ [ppm] 2.50 (1H), 3.12 to 4.26 (29H)

The structure of $R^1$, the value of a in formula (2), b, Y and R in formula (3), the structure of $R^3$ and the structure of $R^4$ when each of the compounds of Comparative Examples 2 and 3 obtained in the manner described above are applied to formula (1) are shown below in Table 2. Further, the number average molecular weight (Mn) of each of the compounds of Comparative Examples 2 and 3 was determined from the $^1$H-NMR measurement described above and a $^{19}$F-NMR measurement. Those results are also shown in Table 2.

TABLE 2

| | $R^1$ | X (formula 3) | | | $R^2$ (formula 2) | | | Number average molecular weight (Mn) | Compound |
| --- | --- | --- | --- | --- | --- | --- | --- | --- | --- |
| | | b | Y | R | a | $R^3$ | $R^4$ | | |
| Example 12 | allyloxy group | 2 | O | H | 2 | formula (4) c = 4.5 d = 4.5 | formula (7) g = 2 h = 1 | 1424 | (M) |
| Example 13 | propargyloxy group | 2 | O | H | 2 | formula (4) c = 4.5 d = 4.5 | formula (7) g = 1 h = 1 | 1348 | (N) |
| Example 14 | allyloxy group | 2 | O | H | 2 | formula (4) c = 7.1 d = 0 | formula (7) g = 1 h = 1 | 1350 | (O) |
| Example 15 | allyloxy group | 2 | O | H | 2 | formula (6) f = 4.4 | formula (7) g = 1 h = 1 | 1350 | (P) |
| Comparative Example 2 | allyloxy group | — | — | — | 2 | formula (4) c = 4.5 d = 4.5 | formula (7) g = 2 h = 1 | 1380 | (Q) |
| Comparative Example 3 | propargyloxy group | — | — | — | 2 | formula (4) c = 4.5 d = 4.5 | formula (7) g = 1 h = 1 | 1304 | (R) |

Next, using the method described below, the compounds from Examples 1 to 11, Comparative Example 1, Examples 12 to 15, and Comparative Examples 2 and 3 were each used to prepare a solution for forming a lubricant layer. Each of the obtained solutions for forming a lubricant layer was then used to form the lubricant layer of a magnetic recording medium in accordance with the method described below, thus obtaining magnetic recording media of Examples 1 to 11, Comparative Example 1, Examples 12 to 15, and Comparative Examples 2 and 3.

[Solution for Forming Lubricant Layer]

Each of the compounds obtained in Examples 1 to 11, Comparative Example 1, Examples 12 to 15, and Comparative Examples 2 and 3 was dissolved in the fluorine-based solvent Vertrel (a registered trademark) XF (a product name, manufactured by Mitsui DuPont Fluorochemicals Co., Ltd.), and the solution was then diluted with Vertrel XF so that application to a protective layer yielded a film thickness of 9 Å to 10 Å, thus completing preparation of a solution for forming a lubricant layer.

[Magnetic Recording Medium]

A magnetic recording medium was prepared having an adhesive layer, a soft magnetic layer, a first base layer, a second base layer, a magnetic layer and a protective layer provided sequentially on a substrate having a diameter of 65 mm. The protective layer was formed from carbon.

The solutions for forming a lubricant layer of Examples 1 to 11, Comparative Example 1, Examples 12 to 15, and Comparative Examples 2 and 3 were each applied by a dipping method to the protective layer of a magnetic recording medium having each of the above layers up to and including the protective layer already formed. The dipping was performed under conditions including an immersion speed of 10 mm/sec, an immersion time of 30 sec, and a withdrawal speed of 1.2 mm/sec.

Subsequently, the magnetic recording medium with the solution for forming a lubricant layer applied was placed in a 120° C. thermostatic oven and heated for 10 minutes, thereby removing the solvent from the solution for forming a lubricant layer and forming a lubricant layer on the protective layer, thus obtaining a magnetic recording medium.

The film thickness of the lubricant layer on each of the magnetic recording media of Examples 1 to 11, Comparative Example 1, Examples 12 to 15, and Comparative Examples 2 and 3 obtained in this manner was measured using an FT-JR (product name: Nicolet iS50, manufactured by Thermo Fisher Scientific Inc.). The results are shown in Tables 3 and 4.

TABLE 3

| Compound | | Film thickness (Å) | Time for Increase in Coefficient of Friction |
|---|---|---|---|
| Example 1 | (A) | 9.0 | A |
| Example 2 | (B) | 9.1 | B |
| Example 3 | (C) | 9.1 | A |
| Example 4 | (D) | 9.0 | B |
| Example 5 | (E) | 9.0 | A |
| Example 6 | (F) | 9.2 | A |
| Example 7 | (G) | 9.0 | A |
| Example 8 | (H) | 9.0 | B |
| Example 9 | (I) | 9.1 | B |
| Example 10 | (J) | 9.0 | B |
| Example 11 | (K) | 9.0 | B |
| Comparative Example 1 | (L) | 9.0 | D |

TABLE 4

| Compound | | Film thickness (Å) | Time for Increase in Coefficient of Friction |
|---|---|---|---|
| Example 12 | (M) | 9.0 | A |
| Example 13 | (N) | 9.0 | A |
| Example 14 | (O) | 9.1 | A |
| Example 15 | (P) | 9.1 | A |
| Comparative Example 2 | (Q) | 9.0 | D |
| Comparative Example 3 | (R) | 9.0 | D |

Next, a wear resistance test described below was conducted using each magnetic recording medium from Examples 1 to 11, Comparative Example 1, Examples 12 to 15, and Comparative Examples 2 and 3.

(Wear Resistance Test)

Using a pin-on-disk friction wear test apparatus, an alumina sphere with a diameter of 2 mm that functioned as the contact was slid across the lubricant layer of the magnetic recording medium under a load of 40 gf and at a sliding speed of 0.25 m/sec, and the coefficient of friction at the surface of the lubricant layer was measured. The sliding time that had elapsed at the point the coefficient of friction at the surface of the lubricant layer underwent a sudden increase was measured. This sliding time prior to the sudden increase in the coefficient of friction was measured four times for the lubricant layer of each magnetic recording medium, and the average (time) of those four values was used as an indicator of the wear resistance of the lubricant coating film. The results for the magnetic recording media using the compounds of Examples 1 to 11, Comparative Example 1, Examples 12 to 15, and Comparative Examples 2 and 3 are shown in Tables 3 and 4. Evaluation of the time elapsed prior to the increase in the coefficient of friction was conducted in accordance with the following criteria.

A: 850 seconds or longer
B: at least 750 seconds, but less than 850 seconds
C: at least 650 seconds, but less than 750 seconds
D: less than 650 seconds For the reason outlined below, the time elapsed prior to the sudden increase in the coefficient of friction can be used as an indicator of the wear resistance of the lubricant layer. As the magnetic recording medium is used, the lubricant layer of the magnetic recording medium undergoes wear, and when this wear leads to loss of the lubricant layer, the contact and the protective layer make direct contact, resulting in a sudden increase in the coefficient of friction. Accordingly, it is thought that the time elapsed prior to this sudden increase in the coefficient of friction has a good correlation with a friction test.

As illustrated in Tables 3 and 4, compared with the magnetic recording media of Comparative Examples 1 to 3, the magnetic recording media of Examples 1 to 15 exhibited a longer sliding time prior to the sudden increase in the coefficient of friction, indicating superior wear resistance. When applied to formula (1), Example 1, Example 5 and Examples 12 to 15 in which Y was O (oxygen) and b was 2 in formula (3), Example 3 and Example 6 in which b was 3, and Example 7 in which R was $CH_3$ exhibited particularly favorable wear resistance.

It is surmised that these results are achieved because in the magnetic recording media of Examples 1 to 15, the compound represented by formula (1) that forms the lubricant layer has an appropriate distance between the alkenyloxy group of 2 to 8 carbon atoms or alkynyloxy group of 3 to 8 carbon atoms represented by $R^1$ and the hydroxyl group(s) of $R^2$ due to the existence of the group represented by X, resulting in an appropriate level of intramolecular interaction between the terminal group represented by $R^1$ and the hydroxyl group(s) of $R^2$.

INDUSTRIAL APPLICABILITY

By using a lubricant for a magnetic recording medium that contains a fluorine-containing ether compound of the present invention, a lubricant layer can be formed that exhibits excellent wear resistance even when the thickness of the layer is thin.

DESCRIPTION OF THE REFERENCE SIGNS

10: Magnetic recording medium
11: Substrate
12: Adhesive layer
13: Soft magnetic layer
14: First base layer
15: Second base layer
16: Magnetic layer
17: Protective layer
18: Lubricant layer

The invention claimed is:

1. A fluorine-containing ether compound represented by a formula (1) shown below:

$$R^1\text{—}X\text{—}R^2\text{—}CH_2\text{—}R^3\text{—}CH_2\text{—}R^4 \quad (1)$$

wherein in the formula (1), $R^1$ is an alkenyloxy group of 2 to 8 carbon atoms or an alkynyloxy group of 3 to 8 carbon atoms, $R^2$ is represented by a formula (2) shown below, in formula (2), a represents an integer of 1 to 3, X is represented by a formula (3) shown below, in formula (3), b represents an integer of 1 to 5, Y is a divalent linking group that is bonded to a carbon atom in formula (2), and R represents an alkyl group of 1 to 6 carbon atoms or H, $R^3$ represents a perfluoropolyether chain, $R^4$ represents a terminal group containing two or three polar groups, wherein each polar group is bonded to a different carbon atom, and the carbon atoms to which the polar groups are bonded are bonded to each other via a linking group containing a carbon atom to which a polar group is not bonded

[Chemical formula 1]

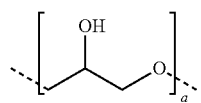

(2)

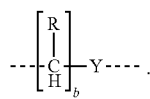

(3)

2. The fluorine-containing ether compound according to claim 1, wherein Y in the formula (3) represents one of O, S and $CH_2$.

3. The fluorine-containing ether compound according to claim 1, wherein R in the formula (3) represents a methyl group or H.

4. The fluorine-containing ether compound according to claim 1, wherein $R^1$ in the formula (1) represents one of a vinyloxy group, an allyloxy group, a 3-butenyloxy group, a 4-pentenyloxy group and a propargyloxy group.

5. The fluorine-containing ether compound according to claim 1, wherein $R^3$ in the formula (1) is represented by any one of formulas (4) to (6) shown below:

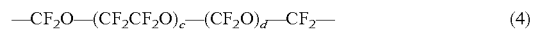

wherein in the formula (4), c and d indicate an average polymerization degree, and each represents a number from 0 to 30, provided that c and d are not both 0,

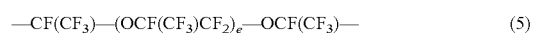

wherein in the formula (5), e indicates an average polymerization degree, and represents a number from 0.1 to 30,

wherein in the formula (6), f indicates an average polymerization degree, and represents a number from 0.1 to 30.

6. The fluorine-containing ether compound according to claim 1, wherein the polar groups in $R^4$ in the formula (1) are hydroxyl groups.

7. The fluorine-containing ether compound according to claim 1, wherein $R^4$ in the formula (1) is a terminal group represented by any one of formulas (7) to (10) shown below:

[Chemical formula 2]

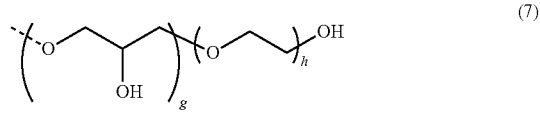

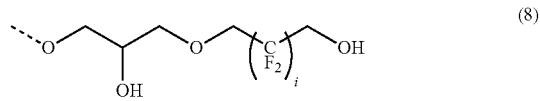

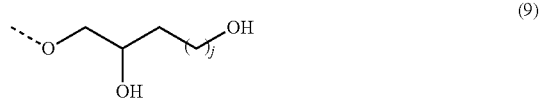

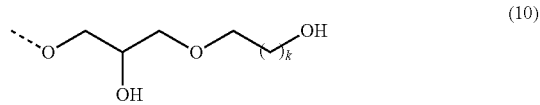

wherein in the formula (7), g represents an integer of 1 or 2, and h represents an integer of 1 to 5,
in the formula (8), i represents an integer of 2 to 5,
in the formula (9), j represents an integer of 1 to 5, and
in the formula (10), k represents an integer of 2 to 5.

8. The fluorine-containing ether compound according to claim 1, having a number average molecular weight within a range from 500 to 10,000.

9. A lubricant for a magnetic recording medium, the lubricant comprising the fluorine-containing ether compound according to claim 1.

10. A magnetic recording medium comprising at least a magnetic layer, a protective layer and a lubricant layer provided sequentially on a substrate, wherein the lubricant layer comprises the fluorine-containing ether compound according to claim 1.

11. The magnetic recording medium according to claim 10, wherein an average thickness of the lubricant layer is within a range from 0.5 nm to 2 nm.

* * * * *